United States Patent
Kamijo

(10) Patent No.: US 7,071,765 B2
(45) Date of Patent: Jul. 4, 2006

(54) BOOST CLOCK GENERATION CIRCUIT AND SEMICONDUCTOR DEVICE

(75) Inventor: Haruo Kamijo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 90 days.

(21) Appl. No.: 10/859,299

(22) Filed: Jun. 3, 2004

(65) Prior Publication Data
US 2005/0007186 A1 Jan. 13, 2005

(30) Foreign Application Priority Data
Jun. 19, 2003 (JP) .............................. 2003-175321

(51) Int. Cl.
*G05F 1/10* (2006.01)
*G05F 3/02* (2006.01)
(52) U.S. Cl. ...................... 327/536; 327/537; 327/589
(58) Field of Classification Search ................ 327/390, 327/391, 589, 534–537, 258
See application file for complete search history.

(56) References Cited

U.S. PATENT DOCUMENTS

| 5,859,632 | A  | * | 1/1999  | Ito ............................... 345/211 |
| 6,157,242 | A  | * | 12/2000 | Fukui ........................... 327/536 |
| 6,278,318 | B1 | * | 8/2001  | Watanabe ..................... 327/536 |
| 6,377,252 | B1 | * | 4/2002  | Ikeda .......................... 345/211 |
| 6,392,936 | B1 | * | 5/2002  | Mulatti et al. ......... 365/189.09 |
| 6,459,330 | B1 |   | 10/2002 | Yasue |
| 6,781,440 | B1 | * | 8/2004  | Huang ......................... 327/537 |
| 6,998,900 | B1 |   | 2/2006  | Kamijo |

FOREIGN PATENT DOCUMENTS

| JP | A 2001-211635 | 8/2001 |
| JP | A 2002-140131 | 5/2002 |
| JP | A 2003-022686 | 1/2003 |

OTHER PUBLICATIONS

U.S. Appl. No. 10/852,209, filed May 25, 2004, Kamuo.
U.S. Appl. No. 10/859,249, filed Jun. 03, 2004, Kamuo.

* cited by examiner

*Primary Examiner*—Dinh T. Le
(74) *Attorney, Agent, or Firm*—Oliff & Berridge, PLC

(57) ABSTRACT

A boost clock generation circuit including: a first switch circuit connected between a first power supply line and a first clock output line to which the first boost clock signal is output; a second switch circuit connected between a second power supply line and the first clock output line; a third switch circuit connected between a third power supply line and a second clock output line to which the second boost clock signal is output; and a fourth switch circuit connected between a fourth power supply line and the second clock output line. One of the first and second switch circuits is exclusively turned ON, and one of the third and fourth switch circuits is exclusively turned ON. The level current drive capability of the first switch circuit differs from the level of current drive capability of the third switch circuit; and the level of current drive capability of the second switch circuit differs from the level of current drive capability of the fourth switch circuit.

19 Claims, 26 Drawing Sheets

US 7,071,765 B2

BOOST CLOCK GENERATION CIRCUIT AND SEMICONDUCTOR DEVICE

Japanese Patent Application No. 2003-175321, filed on Jun. 19, 2003, is hereby incorporated by reference in its entirely.

BACKGROUND OF THE INVENTION

The present invention relates to a boost clock generation circuit and a semiconductor device.

A liquid crystal display device including an electro-optical device may be used as a display device. The size and current consumption of an electronic instrument can be reduced by providing a liquid crystal display device in the electronic instrument.

A high voltage is necessary for driving the liquid crystal display device. Therefore, it is preferably that a driver integrated circuit (IC) (semiconductor device in a broad sense) which drives the electro-optical device includes a power supply circuit which generates a high voltage from the viewpoint of cost. In this case, the power supply circuit includes a voltage booster circuit. The voltage booster circuit generates an output voltage Vout for driving a liquid crystal by boosting a voltage between a high-potential-side system power supply voltage VDD and a low-potential-side ground power supply voltage VSS.

BRIEF SUMMARY OF THE INVENTION

According to one aspect of the present invention, there is provided a boost clock generation circuit which generates first and second boost clock signals used to control two switching elements connected in series between two power source lines in a charge-pump circuit, the boost clock generation circuit comprising:

a first switch circuit connected between a first power supply line to which a first power supply voltage is supplied and a first clock output line to which the first boost clock signal is output;

a second switch circuit connected between a second power supply line to which a second power supply voltage is supplied and the first clock output line;

a third switch circuit connected between a third power supply line to which a third power supply voltage is supplied and a second clock output line to which the second boost clock signal is output; and a fourth switch circuit connected between a fourth power supply line to which a fourth power supply voltage is supplied and the second clock output line, wherein the first and second switch circuits are ON/OFF controlled based on a first clock signal so that one of the first and second circuits is exclusively turned ON;

wherein the third and fourth switch circuits are ON/OFF controlled based on a second clock signal so that one of the third and fourth switch circuits is exclusively turned ON;

wherein the level of current drive capability of the first switch circuit in an ON state differs from the level of current drive capability of the third switch circuit in an ON state; and wherein the level of current drive capability of the second switch circuit in an ON state differs from the level of current drive capability of the fourth switch circuit in an ON state.

According to another aspect of the present invention, there is provided a semiconductor device comprising:

the boost clock generation circuit as defined in claim 1; and a charge-pump circuit which outputs a voltage boosted by charge-pump operation using the first and second boost clock signals;

wherein the charge-pump circuit includes:

first to N+1)th power source lines (N is an integer larger than 2);

first to 2Nth switching elements in which one end of the first switching element is connected to the first power source line, one end of the 2Nth switching element is connected to the (N+1)th power source line, and the remaining switching elements other than the first and 2Nth switching elements are connected in series between the other end of the first switching element and the other end of the 2Nth switching element;

first to (N−1)th boost capacitors in which one end of each of the boost capacitors is connected to a jth connection node ($1 \leq j \leq 2N-3$, j is an odd number) to which the jth and (j+1)th switching elements are connected, and the other end of each of the boost capacitors is connected to a (j+2)th connection node to which the (j+2)th and (j+3)th switching elements are connected; and first to (N−2)th stabilization capacitors in which one end of each of the stabilization capacitors is connected to a kth connection node ($2 \leq k \leq 2N-4$, k is an even number) to which the kth and (K+1)th switching elements are connected, and the other end of each of the stabilization capacitors is connected to a (K+2)th connection node to which the (k+2)th and (k+3)th switching elements are connected;

wherein one of the mth switching element ($1 \leq m \leq 2N-1$, m is an integer) and the (m+1)th switching element is exclusively turned ON or OFF; and wherein two of the first to 2Nth switching elements connected in series between two of the first to (N+1)th power source lines are controlled based on the first and second boost clock signals.

DETAILED DESCRIPTION OF THE EMBODIMENT

Figure 1:
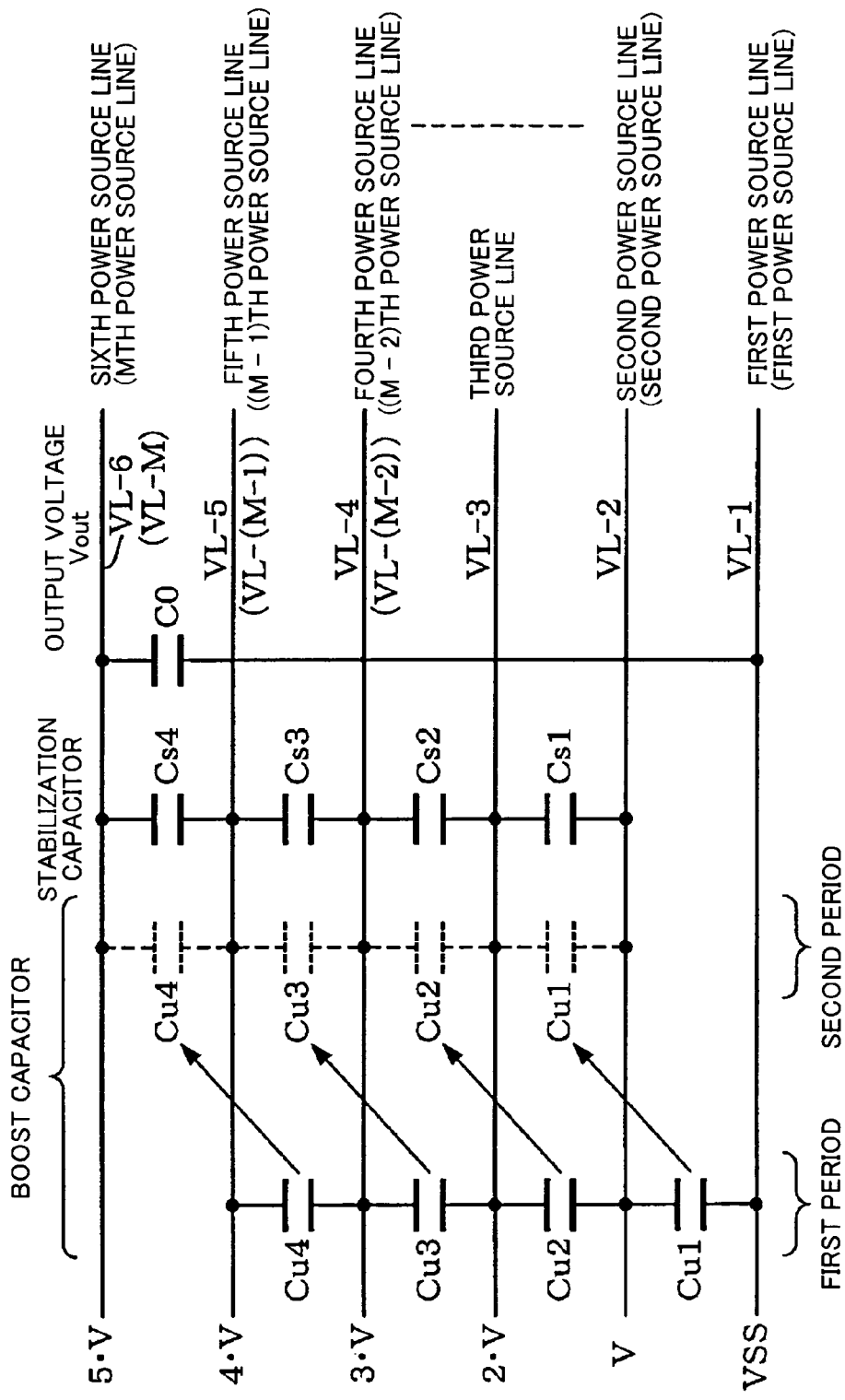
FIG. 1 is a diagram for illustrating the operation of the charge-pump circuit according to one embodiment of the present invention.

Embodiments of the present invention are described below. Note that the embodiments described below do not in any way limit the scope of the invention laid out in the claims herein. In addition, all of the elements of the embodiments described below should not be taken as essential requirements of the present invention.

A reduction of power consumption can be achieved by using a charge-pump circuit which generates a voltage boosted by using a charge-pump method as a voltage booster circuit. The charge-pump circuit includes capacitors. In a liquid crystal panel module including a liquid crystal panel and a driver IC, a mounting step can be simplified and the total cost can be reduced by providing the capacitors of the charge-pump circuit in the IC. For example, since five capacitors are necessary for a conventional charge-pump circuit which performs voltage boosting by multiplying a voltage five times, it is advantageous to provide the capacitors in the IC from the above viewpoint.

In the case where the capacitor of the charge-pump circuit is provided in the driver IC, the area of the built-in capacitor is increased in order to obtain the same capacitance as that of an external capacitor, whereby cost increases. On the other hand, current consumption is increased by reducing the area of the built-in capacitor. Therefore, the area of the built-in capacitor and current consumption have an inconsistent relationship.

Therefore, in order to reduce cost by reducing the area of the capacitor, a charge-pump circuit having the same capacity (charge supply capability, current drive capability, or load drive capability) as that of a conventional voltage booster circuit using a small-capacity capacitor is demanded. In other words, a charge-pump circuit which has the same capability as that of a conventional voltage booster circuit including a capacitor while maintaining the area of the capacitor to be the same (same cost), and which can further reduce current consumption is demanded.

The capacitance of one capacitor provided outside the IC is 0.1 to 1 µF, and the capacitance of one capacitor provided in the IC is about 1 nF. Therefore, in order to obtain the same capability as that of a conventional voltage booster circuit which does not include a capacitor, it is necessary to increase the switching frequency of the switching element of the charge-pump circuit. This increases current consumption due to an increase in the charge/discharge current of the capacitor. Therefore, a charge-pump circuit which reduces the charge/discharge current of the capacitor is demanded.

Even if the above effect is obtained, if the scale of the circuit which generates a boost clock signal is increased due to an increase in the number of switching elements, the effect of reducing cost is reduced. Therefore, it is necessary to generate the boost clock signal for the charge-pump circuit which achieve the above effect with simplified configuration.

According to the following embodiments, a semiconductor device including a charge-pump circuit which reduces cost and power consumption without reducing the load drive capability can be provided.

According to the following embodiments, a boost clock generation circuit which can generate the boost clock signal using a simplified configuration, even if the number of switching elements is increased in a semiconductor device which achieves the above effect, can be provided.

Embodiments of the present invention are described below in detail with reference to the drawings.

A charge-pump circuit which is suitable provided in a semiconductor device (integrated circuit or IC) is described below. A boost clock generation circuit which is suitable for generating a boost clock signal for the charge-pump circuit is then described.

1. Charge-pump circuit.

A charge-pump circuit in this embodiment includes a plurality of capacitors, and outputs a voltage boosted by using a charge-pump method.

FIG. 1 is a diagram for illustrating the operation of the charge-pump circuit according to one embodiment of the present invention. The charge-pump circuit in this embodiment includes first to Mth power source lines VL-1 to VL-M (M is an integer larger than 3). The charge-pump circuit outputs a boosted voltage $(M-1) \times V$ obtained by multiplying a voltage V between the first and second power source lines VL-1 and VL-2 (M−1) times to the Mth power source line VL-M as the output voltage Vout. FIG. 1 shows the operation principle when M is six (when the voltage is multiplied five times).

The charge-pump circuit includes first to (M−2)th boost capacitors Cu1 to Cu(M−2), and first to (M−3)th stabilization capacitors (s1 to Cs(M−3).

The jth boost capacitor Cuj ($1 \leq j \leq M-2$, j is an integer) among the first to (M−2)th boost capacitors Cu1 to Cu(M−2) is connected between the jth power source line and the (j+1)th power source line in a first period. The jth boost capacitor Cuj is connected between the (j+1)th power source line and the (j+2)th power source line in a second period subsequent to the first period. Specifically, the power source lines connected with the jth boost capacitor Cuj are changed corresponding to the first and second periods.

For example, the first boost capacitor Cu1 is connected between the first and second power source lines VL-1 and VL-2 in the first period, and is connected between the second and third power source lines VL-2 and VL-3 in the second period. The second boost capacitor Cu2 is connected between the second and third power source lines VL-2 and VL-3 in the first period, and is connected between the third and fourth power source lines VL-3 and VL-4 in the second period. The (M−2)th boost capacitor Cu(M−2) is connected between the (M−2)th and (M−1)th power source lines VL-(M−2) and VL-(M−1) in the first period, and is connected between the (M−1)th and Mth power source lines VL-(M−1) and VL-M in the second period.

The kth stabilization capacitor Csk (1≦k≦M−3, k is an integer) among the first to (M−3)th stabilization capacitors Cs1 to Cs(M−3) is connected between the (k+1)th power source line and the (k+2)th power source line. The kth stabilization capacitor Csk stores (is charged with) an electric charge discharged from the kth boost capacitor Cuk in the second period. Specifically, the power source lines connected with the kth stabilization capacitor Csk are common in the first and second periods.

For example, the first stabilization capacitor Cs1 is connected between the second and third power source lines VL-2 and VL-3. The first stabilization capacitor Cs1 stores an electric charge discharged from the first boost capacitor Cu1 in the second period. The first stabilization capacitor Cs1 is connected between the second and third power source lines VL-2 and VL-3 in the second period. The second stabilization capacitor Cs2 is connected between the third and fourth power source lines VL-3 and VL-4. The second stabilization capacitor Cs2 stores an electric charge discharged from the second boost capacitor Cu2 in the second period. The (M−3)th stabilization capacitor Cs(M−3) is connected between the (M−2)th and (M−1)th power source lines VL-(M−2) and V-(M−1). The (M−3)th stabilization capacitor Cs(M−3) stores an electric charge discharged from the (M−3)th boost capacitor Cu(M−3) in the second period.

This operation of the charge-pump circuit is described below taking the case where M is six as shown in FIG. 1 as an example. A low-potential-side ground power supply voltage VSS is supplied to the first power source line VL-1. A high-potential-side system power supply voltage VDD is supplied to the second power source line VL-2. The voltage V is applied between the first and second power source lines VL-1 and VL-2.

In the first period, the voltage V is applied to the first boost capacitor Cu1. In the second period subsequent to the first period, the first boost capacitor Cu1 is connected between the second and third power source line VL-2 and VL-3. Therefore, an electric charge stored in the first boost capacitor Cu1 in the first period is discharged and stored in the first stabilization capacitor Cs1. This causes the third power source line VL-3 to which one end of the first stabilization capacitors Cs1 is connected to be at a voltage 2×V with respect to the voltage V of the second power source line VL-2 to which the other end of the first stabilization capacitor Cs1 is connected.

An electric charge stored in second and third boost capacitors Cu2 and Cu3 in the first period is discharged in the second period, and stored in the second and third stabilization capacitors Cs2 and Cs3, respectively.

As a result, the voltages of the fourth to sixth power source lines VL-4 to VL-6 respectively become 3×V, 4×V, and 5×V. Specifically, the voltage 5×V is applied between the first and sixth power source lines VL-1 and VL-6 as the output voltage of the charge-pump circuit.

The charge-pump circuit preferably further includes an (M−2)th stabilization capacitor Cs(M−2) connected between the (M−1)th power source line VL-(M−1) and the Mth power source line VL-M, and the (M−2)th stabilization capacitor Cs(M−2) preferably stores an electric charge discharged from the (M−2)th boost capacitor Cu(M−2) in the second period. Specifically, it is preferable that a fourth stabilization capacitor Cs4 be further connected between the fifth and sixth power source lines VL-5 and VL-6 when M is six. In FIG. 1, the fourth stabilization capacitor Cs4 corresponding to the (M−2)th stabilization capacitor Cs(M−2) is connected. In this case, the output voltage Vout boosted in the second period can be supplied in a stable state by the fourth stabilization capacitor Cs4.

In FIG. 1, the charge-pump circuit preferably further includes a capacitor connected between the first power source line VL-1 and the Mth power source line VL-M. Specifically, it is preferable that a capacitor be connected between the first and sixth power source lines VL-1 and VL-6 when M is six. In FIG. 1, a capacitor C0 is connected between the first and sixth power sources lines VL-1 and VL-6 corresponding to the first and Mth power source lines VL-1 and VL-M, respectively. In this case, a decrease in the voltage level due to the load connected with the sixth power source line VL-6 can be prevented.

Figure 2:
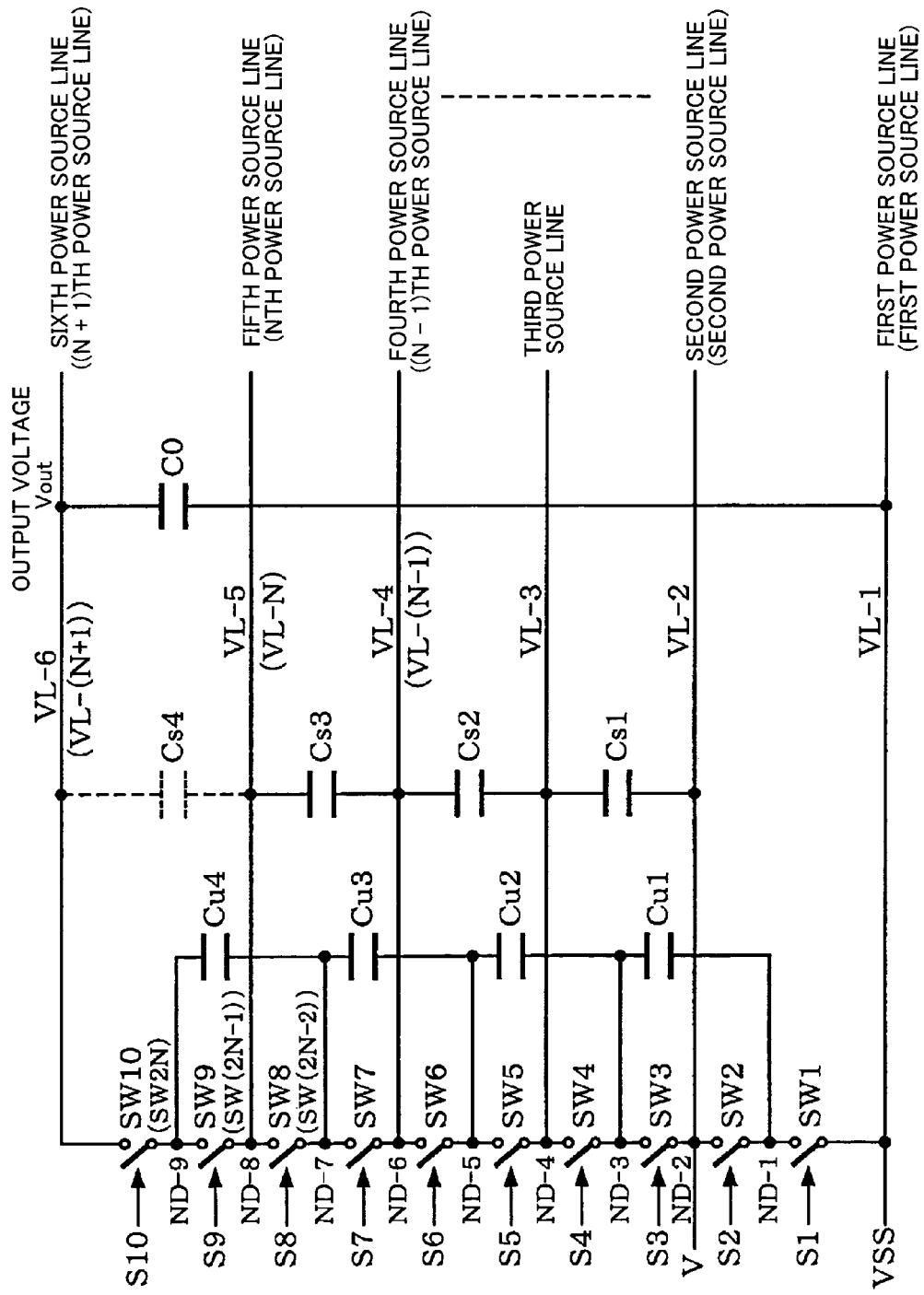
FIG. 2 is a diagram showing the configuration of the charge-pump circuit shown in FIG. 1.

FIG. 2 shows the configuration of the charge-pump circuit shown in FIG. 1. In the charge-pump circuit shown in FIG. 2, the power source lines connected with each boost capacitor in the first and second periods are changed by controlling switching elements so that one of two switching elements connected in series between two power source lines is exclusively turned ON.

The charge-pump circuit shown in FIG. 2 includes the first to (N+1)th power source lines VL-1 to VL-(N+1) (N is an integer larger than 2). The charge-pump circuit outputs a boosted voltage N•V obtained by multiplying the voltage V between the first and second power source lines VL-1 and VL-2 N times to the (N+1)th power source line VL-(N+1) as the output voltage Vout. FIG. 2 shows the configuration example when N is five (when the voltage is multiplied five times).

The charge-pump circuit includes first to 2Nth switching elements SW1 to SW2n, first to (N−1)th boost capacitors Cu1 to Cu(N−1), and first to (N−2)th stabilization capacitors Cs1 to Cs(N−2).

The first to 2Nth switching elements are connected in series between the first and (N+1)th power source lines VL-1 and VL-(N+1). In more detail, one end of the first switching element SW1 is connected with the first power source line VL-1, and one end of the 2Nth switching element SW2N is connected with the (N+1)th power source line VL-(N+1). The remaining switching elements SW2 to SW(2N−1) excluding the first and 2Nth switching elements SW1 and SW2N are connected in series between the other end of the first switching element SW1 and the other end of the 2Nth switching element SW2N.

One end of each of the first to (N−1)th boost capacitors Cu1 to Cu(N−1) is connected with a jth connection node ND-j (1≦j≦2N−3, j is an odd number) to which the jth and (j+1)th switching elements SWj and SW(j+1) are connected.

The other end of the boost capacitor is connected with the (j+2)th connection node ND-(j+2) to which the (j+2)th and (j+3)th switching elements SW(j+2) and SW(j+3) are connected.

Specifically, the first boost capacitor Cu1 is connected between the first and third connection node ND-1 and ND-3. The first connection node ND-1 is a node to which the first and second switching elements SW1 and SW2 are connected, and the third connection node ND-3 is a node to which the third and fourth switching elements SW3 and SW4 are connected. The second boost capacitor Cu2 is connected between the third and fifth connection nodes ND-3 and ND-5. The fifth connection node ND-5 is a node to which the fifth sixth switching elements SW5 and SW6 are connected. The (N−1)th boost capacitor Cu(N−1) is connected between the (2N−3)th and (2N−1)th connection nodes ND-(2N−3) and ND-(2N−1). The (2N−3)th connection node ND-(2N−3) is a node to which the (2N−3)th and (2N−2)th switching elements SW(2N−3) and SW(2N−2) are connected, and the (2N−1)th connection node ND(2N−1) is a node to which the (2N−1)th and 2Nth switching elements SW(2N−1) and SW2N are connected.

In FIG. 2, one end of each of the first to (N−2)th stabilization capacitors Cs1 to Cs(N−2) is connected with the kth connection node ND-k ($2 \leq k \leq 2N-4$, k is an even number) to which the kth and (k+1)th switching elements SWk and SW(k+1) are connected. The other end of the stabilization capacitor is connected with the (k+2)th connection node ND-(k+2) to which the (k+2)th and (k+3)th switching elements SW(k+2) and SW(k+3) are connected.

Specifically, the first stabilization capacitor Cs1 is connected between the second and fourth connection nodes ND-2 and ND-4. The second connection node ND-2 is a node to which the second and third switching elements SW2 and SW3 are connected, and the fourth connection node ND-4 is a node to which the fourth and fifth switching elements SW4 and SW5 are connected. The second stabilization capacitor Cs2 is connected between the fourth and sixth connection nodes ND-4 and DN-6. The sixth connection node ND-6 is a node to which the sixth and seventh switching elements SW6 and SW7 are connected. The (N−2)th stabilization capacitor Cs(N−2) is connected between the (2N−4)th and (2N−2)th connection nodes ND-(2N−4) and ND-(2N−2). The (2N−4)th connection node ND-(2N−4) is a node to which the (2N−4)th and (2N−3)th switching elements SW(2N−4) and SW(2N−3) are connected, and the (2N−2)th connection node ND-(2N−2) is a node to which the (2N−2)th and (2N−1)th switching elements SW(2N−2) and SW(2N−1) are connected.

In the charge-pump circuit shown in FIG. 2, the switching elements are controlled so that one of the mth switching element SWm ($1 \leq m \leq 2N-1$, m is an integer) and the (m+1)th switching element SW(m+1) is exclusively turned ON, and the voltage N•V obtained by multiplying the voltage between the first and second power source lines N times is output between the first and (N+1)th power source lines VL-1 and VL-(N+1).

Figure 3:
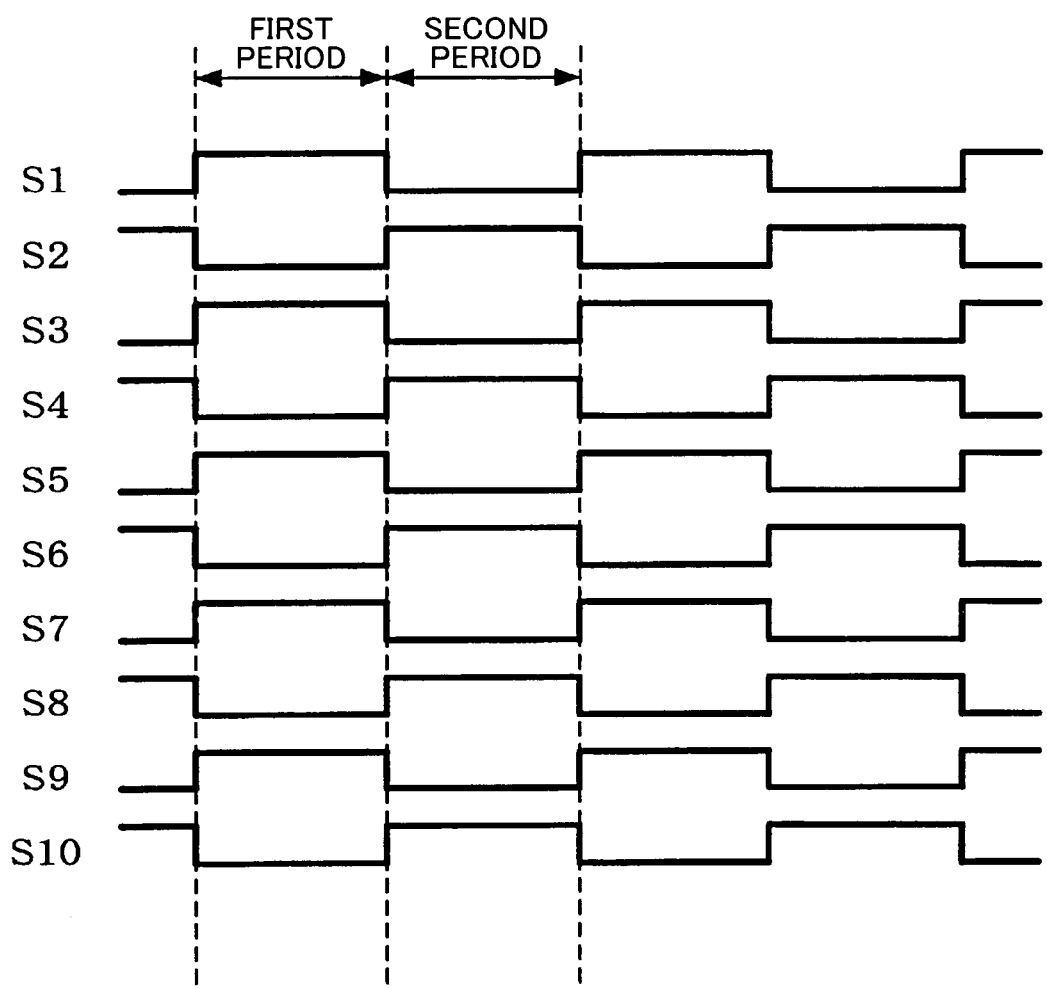
FIG. 3 is a timing chart schematically showing the operation of the boost clock signal shown in FIG. 2.

FIG. 3 schematically shows the operation of the boost clock signals which control the switching elements shown in FIG. 2.

In FIG. 3, a boost clock signal (switch control signal in a broad sense) which controls (ON/OFF controls) the first switching element SW1 is denoted by S1, a boost clock signal which controls the second switching element SW2 is denoted by S2, and a boost clock signal which controls the 2Nth switching element SW2N is denoted by S2N. FIG. 3 schematically shows an operation timing of the boost clock signals S1 to S10 when N is five. The boost clock signal is a clock signal which repeats the operation shown in FIG. 3.

The switching element is turned ON when the boost clock signal is at an H level, whereby both ends of the switching element are electrically connected and the switching element is in a conducting state. The switching element is turned OFF when the boost clock signal is at an L level, whereby both ends of the switching element are electrically disconnected and the switching element is in a nonconducting state.

The boost clock signals S1, S3, . . . , and S9 are set at an H level in the first period, and set at an L level in the second period. The boost clock signals S2, S4, . . . , and S10 are set at an L level in the first period, and set at an H level in the second period. The switching elements are controlled in this manner so that one of the mth switching element SWm and the (m+1)th switching element SW(m+1) is exclusively turned ON.

It is preferable that the switching elements be controlled so that a period in which the mth switching element SWm and the (m+1)th switching element SW(m+1) are turned ON at the same time does not exist. This is because current consumption is increased due to shoot-through current if the mth switching element SWm and the (m+1)th switching element SW(m+1) are turned ON at the same time.

In FIG. 3, the second period is a period immediately after the first period. However, the present invention is not limited thereto. For example, the second period may start when a predetermined period has elapsed after the first period. It suffices that the second period start after the first period has elapsed.

The operation of the charge-pump circuit shown in FIG. 2 is described below with reference to FIGS. 4A and 4B taking the case where N is five (when the voltage is multiplied five times) as an example.

Figure 4A:
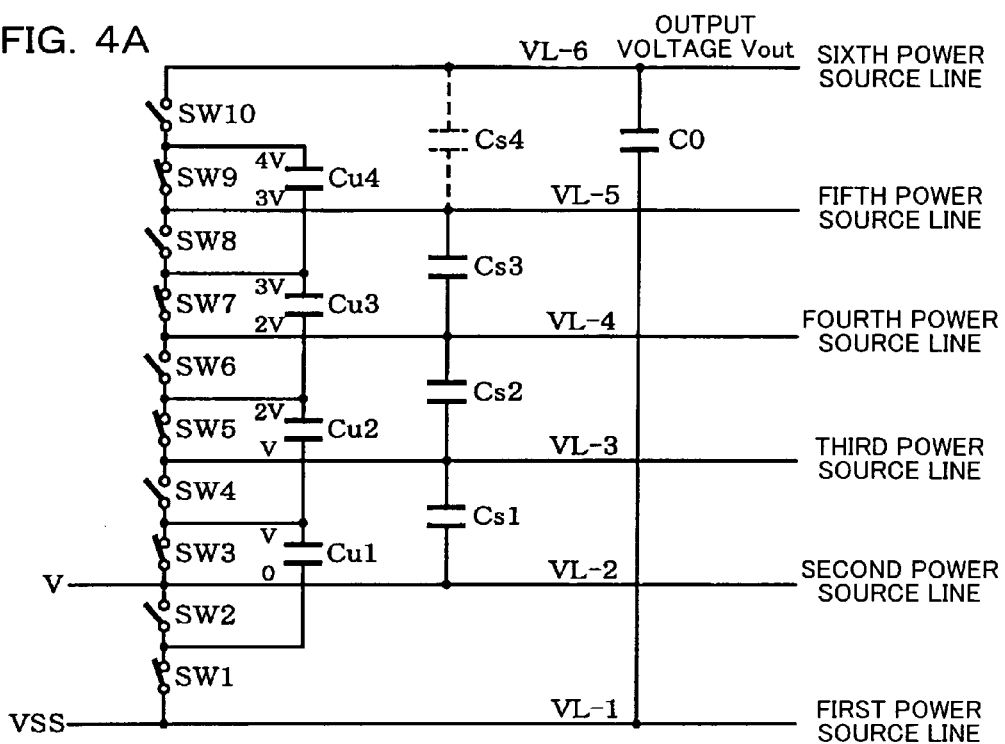
FIG. 4A shows a switching state of the charge-pump circuit of FIG. 2 in the first period.

FIG. 4A shows a switching state of the charge-pump circuit of FIG. 2 in the first period. FIG. 4B shows a switching state of the charge-pump circuit of FIG. 2 in the second period.

In the first period, the first, third, fifth, seventh, and ninth switching elements SW1, SW3, SW5, SW7, and SW9 are turned ON, and the second, fourth, sixth, eighth, and tenth switching elements SW2, SW4, SW6, SW8, and SW10 are turned OFF (FIG. 4A). The voltage V (V, 0) between the first and second power source lines VL-1 and VL-2 is applied to the first boost capacitor Cu1 in the first period. Therefore, an electric charge is stored in the first boost capacitor Cu1 in the first period so that the voltage of the first boost capacitor Cu1 becomes V.

Figure 4B:
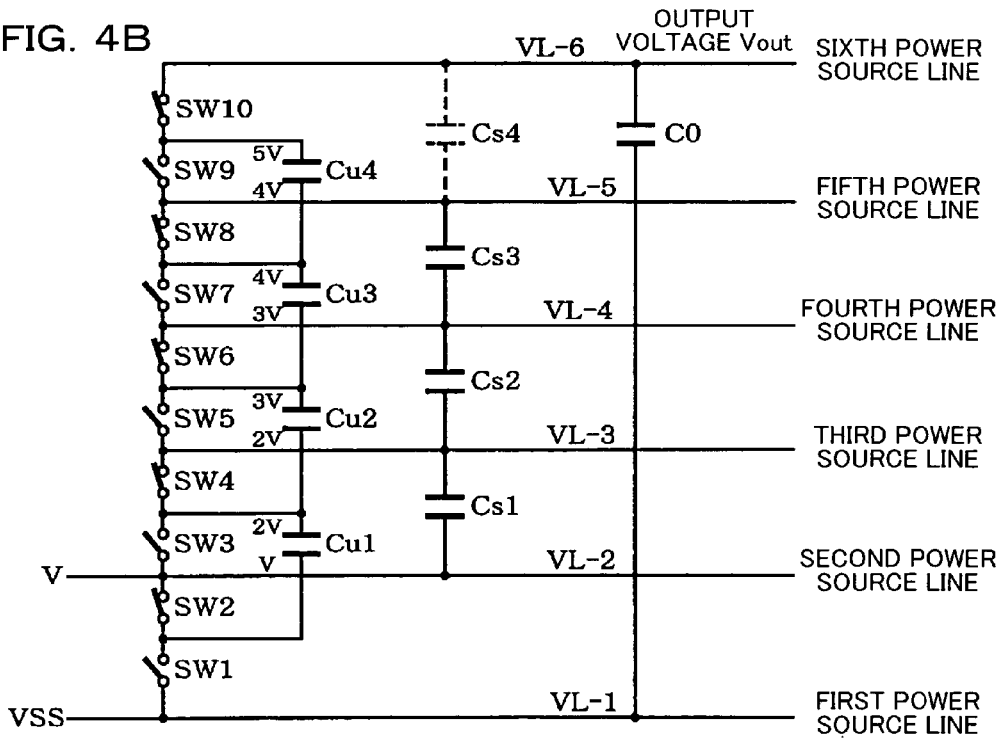
FIG. 4B shows a switching state of the charge-pump circuit of FIG. 2 in the second period.

In the second period, the first, third, fifth, seventh, and ninth switching elements SW1, SW3, SW5, SW7, and SW9 are turned OFF, and the second, fourth, sixth, eighth, and tenth switching elements SW2, SW4, SW6, SW8, and SW10 are turned ON (FIG. 4B). This causes the second power source line VL-2 to be connected with one end of the first boost capacitor Cu1 instead of the first power source line VL-1. Therefore, the other end of the first boost capacitor Cu1 is at a voltage 2•V. Since the other end of the first boost capacitor Cu1 is connected with the third power source line VL-3, the voltage V is also applied to the first stabilization capacitor Cs1 connected between the second and third power source lines VL-2 and VL-3, and an electric charge is stored in the first stabilization capacitor Cs1 so that the voltage of the first stabilization capacitor Cs1 becomes V. This allows the voltage of the other end of the first stabilization capacitor Cs1 to be 2•V.

The above description also applies to the second boost capacitor Cu2. Specifically, the second power source line VL-2 is connected with one end of the second boost capacitor Cu2 in the first period. The voltage V is supplied to the second power source line VL-2. However, the other end of the first boost capacitor Cu1 is connected with the second power source line VL-2. The other end of the first stabilization capacitor Cs1 is connected with the other end of the second boost capacitor Cu2. Therefore, the voltage V (2V, V) is applied to the second boost capacitor Cu2. Therefore, an electric charge is stored in the second boost capacitor Cu2 in the first period so that the voltage of the second boost capacitor Cu2 becomes V.

The voltage of the other end of the first boost capacitor Cu1 becomes 2•V in the second period. Therefore, the voltage of the other end of the second boost capacitor Cu2 of which one end is connected with the first boost capacitor Cu1 becomes 3•V. Since the other end of the second boost capacitor Cu2 is connected with the fourth power source line VL-4, the voltage V is applied to the second stabilization capacitor Cs2 connected between the third and fourth power source lines VL-3 and VL-4, and an electric charge is stored in the second stabilization capacitor Cs2 so that the voltage of the second stabilization capacitor Cs2 becomes V.

The voltage of the other end of the third and fourth boost capacitors Cu3 and Cu4 becomes a voltage boosted by using the charge-pump method in the same manner as described above. As a result, the voltage of the sixth power source line VL-6 becomes 5×V, and is output as the output voltage Vout.

In FIGS. 2, 4A, and 4B, the charge-pump circuit preferably further includes an (N−1)th stabilization capacitor Cs(N−1) connected between the Nth power source line VL-N and the (N+1)th power source line VL-(N+1), and the (N−1)th stabilization capacitor Cs(N−1) preferably stores an electric charge discharged from the (N−1)th boost capacitor Cu(N−1) in the second period. Specifically, it is preferable that the fourth stabilization capacitor Cs4 be further connected between the fifth and sixth power source lines VL-5 and VL-6 when N is five. In FIGS. 2, 4A, and 4B, the fourth stabilization capacitor Cs4 corresponding to the (N−1)th stabilization capacitor Cs(N−1) is indicated by broken lines. In this case, the output voltage Vout boosted in the second period can be supplied in a stable state by the fourth stabilization capacitor Cs4.

In FIGS. 2, 4A, and 4B, the charge-pump circuit preferably further includes a capacitor connected between the first power source line VL-1 and the (N+1)th power source line VL-(N+1). Specifically, it is preferable that a capacitor be connected between the first and sixth power source lines VL-1 and VL-6 when N is five. In FIGS. 2, 4A, and 4B, the capacitor C0 is connected between the first and sixth power source lines VL-1 and VL-6 corresponding to the first and (N+1)th power source lines VL-1 and VL-(N+1). In this case, a decrease in the voltage level due to the load connected with the sixth power source line VL-6 can be prevented.

A voltage equal to the voltage V between the first and second power source lines VL-1 and VL-2 is applied to each boost capacitor and each stabilization capacitor by forming the charge-pump circuit as described above. It suffices that each switching element is resistant to a signal having an amplitude of the voltage V or 2×V instead of the boosted voltage N×V, as described later. Therefore, in the case of providing each boost capacitor and each stabilization capacitor in the IC, the switching element and the capacitor can be formed by using a low-voltage manufacturing process which implements a reduction of cost without using a high-voltage resistant manufacturing process which is resistant to a voltage of N×V.

1.1 Built-in capacitor

The case where the capacitors of the charge-pump circuit are provided in a semiconductor device is described below.

Figure 5:
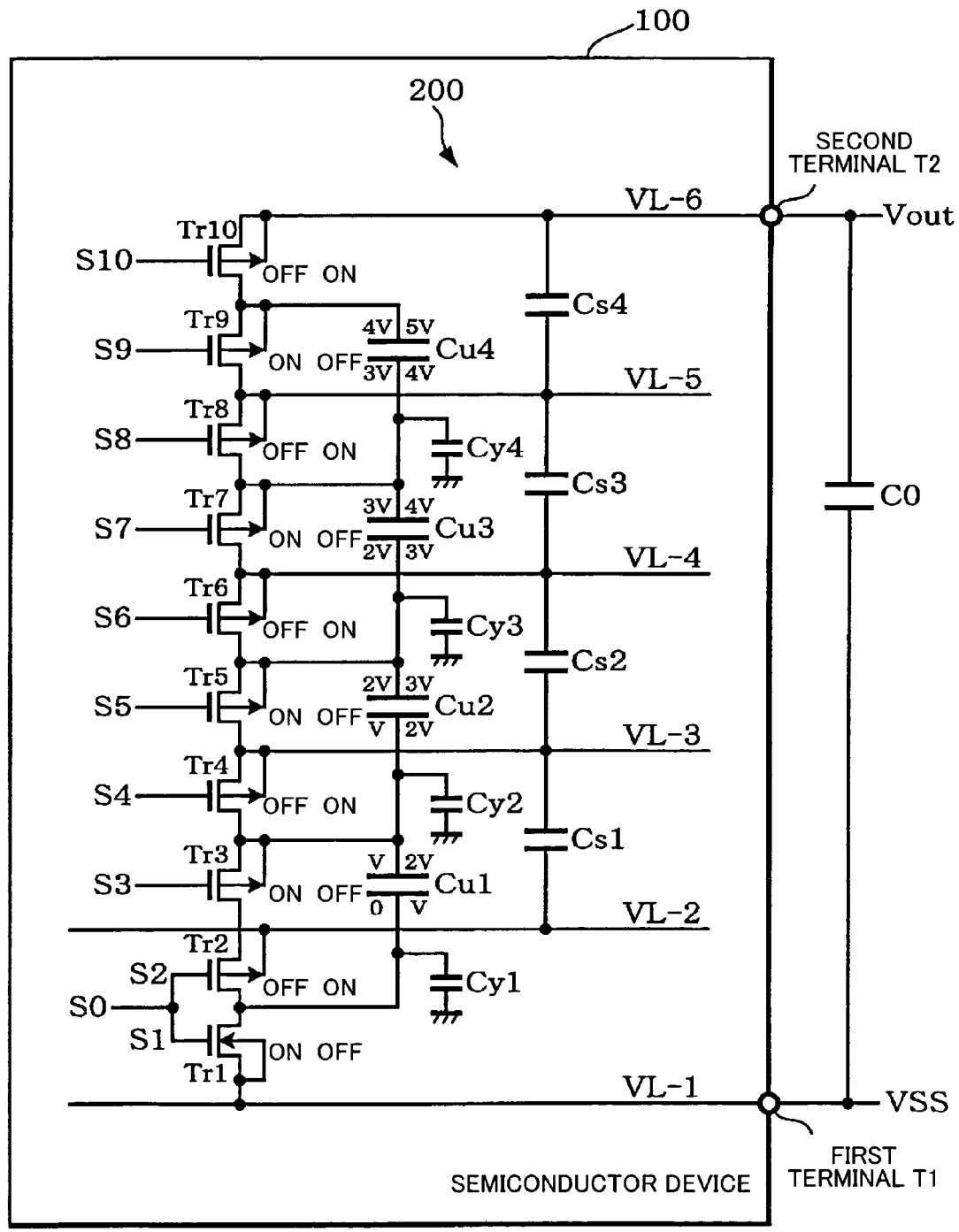
FIG. 5 is a diagram schematically showing the configuration of a semiconductor device including the charge-pump circuit according to one embodiment of the present invention.

FIG. 5 is a diagram schematically showing the configuration of a semiconductor device including the charge-pump circuit according to one embodiment of the present invention. In FIG. 5, components that are the same as those in FIG. 2 are denoted by the same reference numbers and further description thereof is omitted.

A semiconductor device 100 (integrated circuit device (IC) or chip) includes a charge-pump circuit 200 shown in FIG. 2. Specifically, the semiconductor device 100 includes first to 2Nth switching elements (N is an integer larger than 2), one end of the first switching element being connected with the first power source line, one end of the 2Nth switching element being connected with the (N+1)th power source line, and the remaining switching elements excluding the first and 2Nth switching elements being connected in series between the other end of the first switching element and the other end of the 2Nth switching element, first to (N−1)th boost capacitors, one end of each of the boost capacitors being connected with a jth connection node ($1 \leq j \leq 2N-3$, j is an odd number) to which the jth and (j+1)th switching elements are connected, and the other end of the boost capacitor being connected with a (j+2)th connection node to which the (j+2)th and (j+3)th switching elements are connected, and first to (N−2)th stabilization capacitors, one end of each of the stabilization capacitors being connected with a kth connection mode ($2 \leq k \leq 2N-4$, k is an even number) to which the kth and (k+1)th switching elements are connected, and the other end of the stabilization capacitor being connected with a (k+2)th connection node to which the (k+2)th and (k+3)th switching elements are connected. In the semiconductor device 100, the switching elements are controlled so that one of the mth switching element ($1 \leq m \leq 2N-1$, m is an integer) and the (m+1)th switching element is exclusively turned ON.

The charge-pump circuit 200 may further include an (N−1)th stabilization capacitor connected between the Nth power source line and the (N+1)th power source line, and the (N−1)th stabilization capacitor may store an electric charge discharged from the (N−1)th boost capacitor in the second period.

FIG. 5 shows the configuration of the charge-pump circuit 200 when N is five (when the voltage is multiplied five times). The fourth stabilization capacitor Cs4 corresponding to the (N−1)th stabilization capacitor Cs(N−1) is connected between the fifth and sixth power source lines VL-5 and VL-6.

The semiconductor device 100 includes the boost capacitors and the stabilization capacitors of the charge-pump circuit 200. In FIG. 5, the semiconductor device 100 includes the first to fourth boost capacitors Cu1 to Cu4 and the first to fourth stabilization capacitors Cs1 to Cs4 of the charge-pump circuit 200.

Only a capacitor for stabilizing the boosted voltage is provided outside the semiconductor device 100. In more detail, the semiconductor device 100 includes first and second terminals T1 and T2 which are electrically connected with the first and (N+1)th power source line VL-1 and VL-(N+1), respectively, and the capacitor C0 is connected between the first and second terminals T1 and T2 outside semiconductor device 100. In FIG. 5, the semiconductor device 100 includes the first and second terminals T1 and T2 electrically connected with the firs and sixth power source lines VL-1 and VL-6, respectively, and the capacitor C0 is connected between the first and second terminals T1 and T2 outside the semiconductor device 100.

The switching element of the charge-pump circuit 200 is formed by a metal-oxide semiconductor (MOS) transistor. In more detail, the first switching element SW1 is formed by an n-channel MOS transistor Tr1. The second to tenth switching elements SW2 to SW10 are formed by p-channel MOS transistors Tr2 to Tr10.

Figure 6:
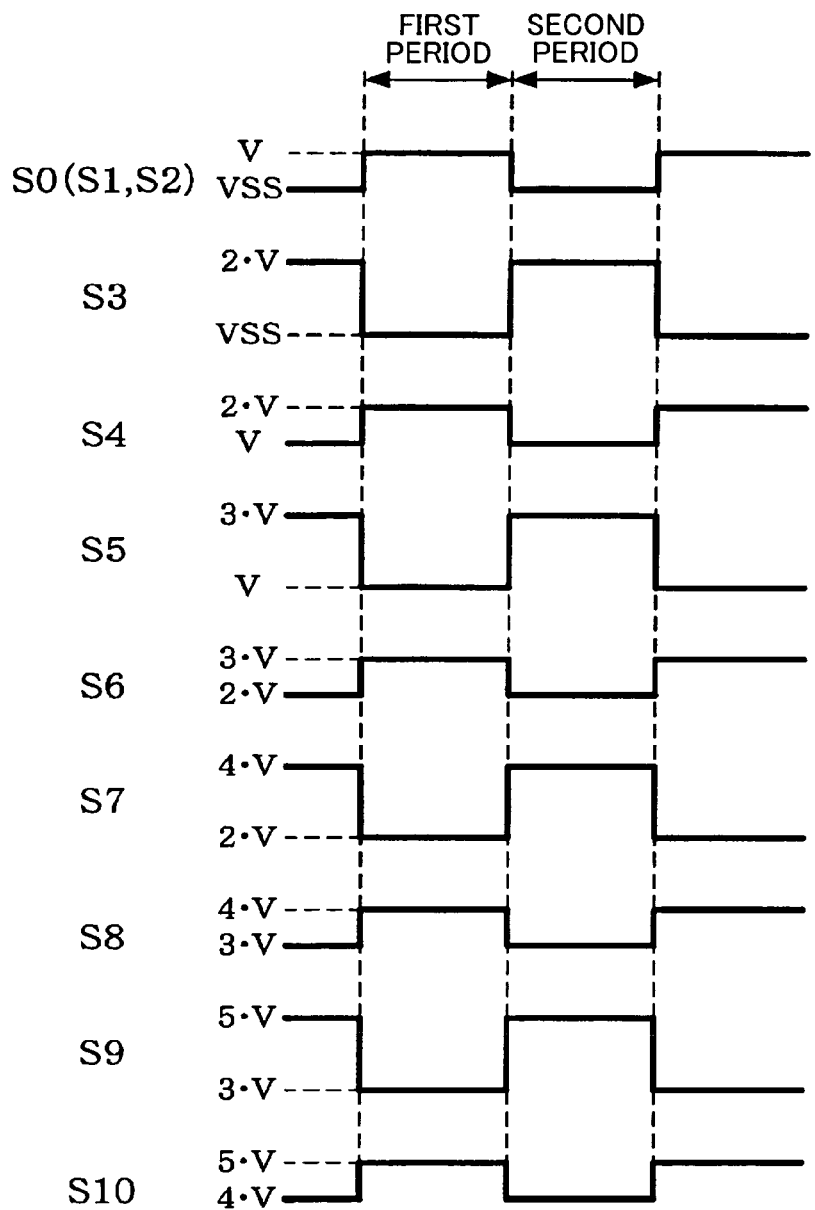
FIG. 6 is a timing chart schematically showing the operation of the boost clock signal shown in FIG. 5.

Therefore, the boost clock signals S1 to S10 which ON/OFF control the MOS transistors as the switching elements are generated at a timing shown in FIG. 6. A boost clock signal S0 is used as the boost clock signals S1 and S2 for the MOS transistors Tr1 and Tr2.

In FIG. 5, the conducting state of each MOS transistor in the first and second periods is indicated by "ON" or "OFF". The conducting state in the first period is shown on the left, and the conducting state in the second period is shown on the right.

FIG. 5 also shows the voltages applied to each boost capacitor in the first and second periods. The voltage applied in the first period is shown on the left, and the voltage applied in the second period is shown on the right.

The operation of the charge-pump circuit 200 is the same as described with reference to FIGS. 2, 3, 4A, and 4B. Therefore, description of the operation is omitted.

1.2 Output impedance

The output impedance of the charge-pump circuit 200 is calculated below in order to describe the effects of the charge-pump circuit 200.

The output impedance Z of the charge-pump circuit 200 corresponds to a slope along with the voltage of the sixth power source line VL-6 drops when a current I is drawn from the sixth power source line VL-6 to which the boosted output voltage Vout is supplied, as shown by the following equation (1).

$$Vout = I \cdot Z \qquad (1)$$

The capability of the charge-pump circuit is expressed by using the output impedance of the charge-pump circuit. The smaller the value of the output impedance, the smaller the voltage drop when the current is drawn by the load. Therefore, the smaller the value of the output impedance, the greater (higher) the capability (charge supply capability and load drive capability) of the charge-pump circuit, and the greater the value of the output impedance, the smaller (lower) the capability of the charge-pump circuit. The capability of the charge-pump circuit is preferably greater.

The output impedance of the charge-pump circuit 200 is simply calculated as described below.

Figure 7A:
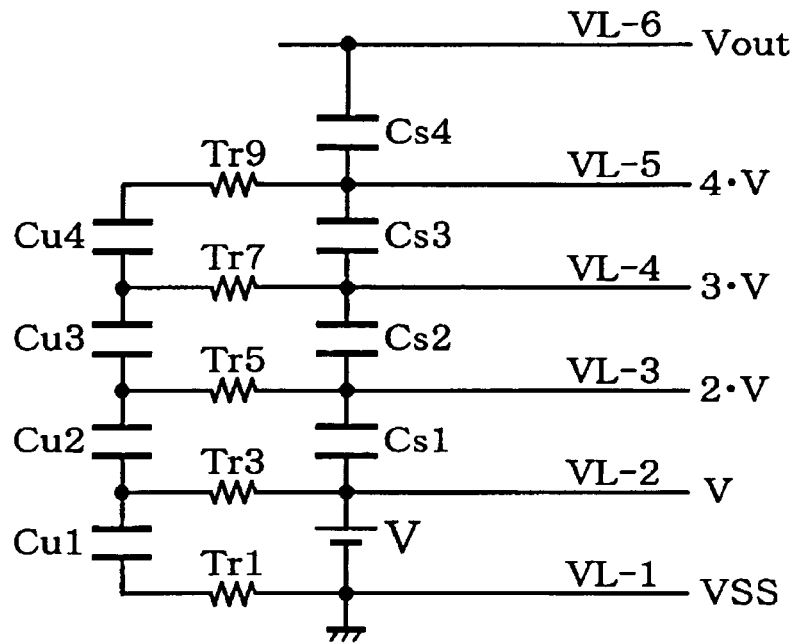
FIGS. 7A and 7B are equivalent circuit diagrams of the charge-pump circuit.
Figure 7B:
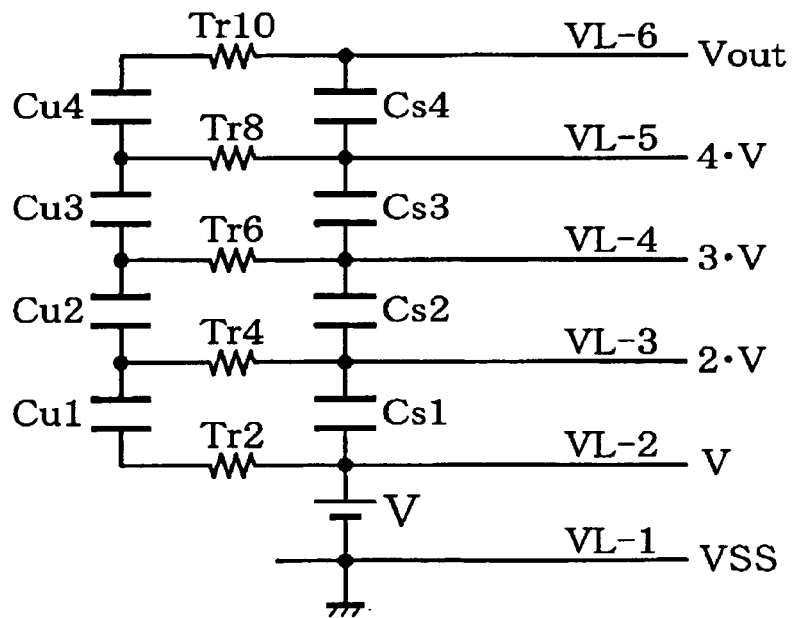

FIGS. 7A and 7B show equivalent circuits of the charge-pump circuit 200. FIG. 7A shows an equivalent circuit of the charge-pump circuit 200 in the first period. FIG. 7B shows an equivalent circuit of the charge-pump circuit 200 in the second period. A resistance element in each equivalent circuit shows the ON resistance of the MOS transistor. A power supply in each equivalent circuit shows that the voltage V is applied between the first and second power source lines VL-1 and VL-2.

Eight states of the charge-pump operation of the charge-pump circuit 200 are considered below by using equivalent circuits. The impedance in each state is then calculated.

FIGS. 8A, 8B, 8C, and 8D show equivalent circuits showing first four states of charge-pump operation of the charge-pump circuit 200.

FIGS. 9A, 9B, 9C, and 9D show equivalent circuits showing second four states of charge-pump operation of the charge-pump circuit 200.

Figure 8A:
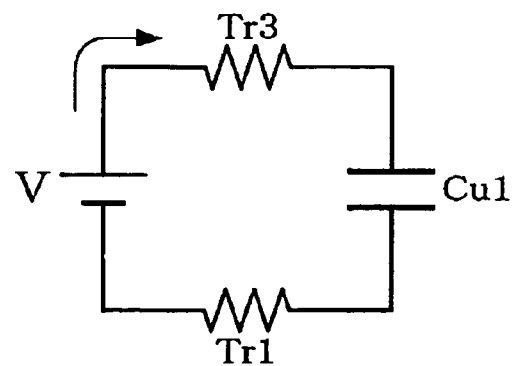
FIGS. 8A, 8B, 8C, and 8D are equivalent circuit diagrams showing first four states of charge-pump operation of the charge-pump circuit.
Figure 8B:
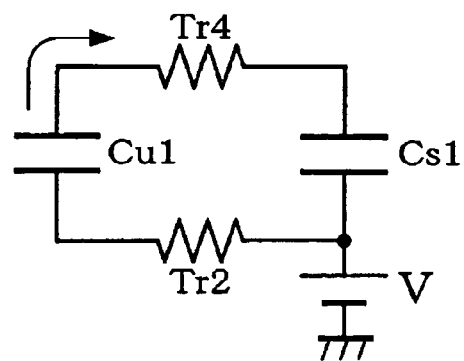
Figure 8C:
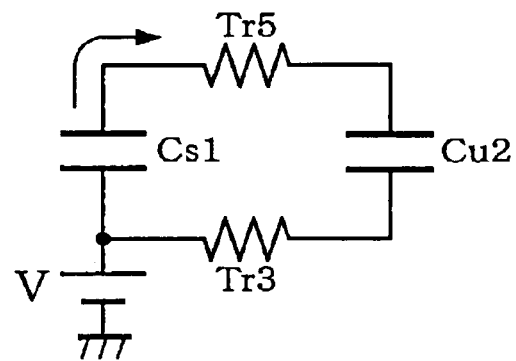
Figure 8D:
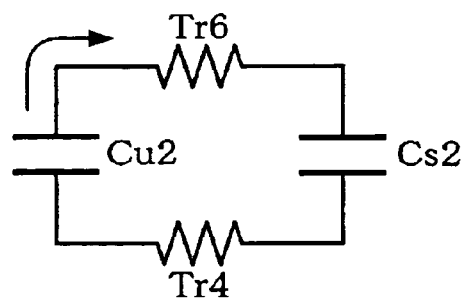

FIG. 8A is an equivalent circuit in which the MOS transistors Tr1 and Tr3 are turned ON. FIG. 8B is an equivalent circuit in which the MOS transistors Tr2 and Tr4 are turned ON. FIG. 8C is an equivalent circuit in which the MOS transistors Tr3 and Tr5 are turned ON. FIG. 8D is an equivalent circuit in which the MOS transistors Tr4 and Tr6 are turned ON.

Figure 9A:
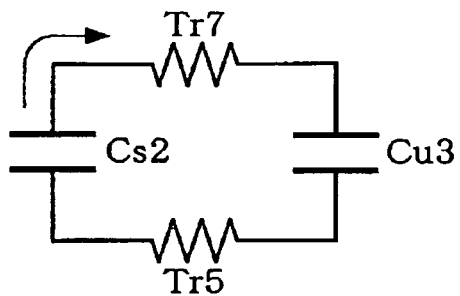
FIGS. 9A, 9B, 9C, and 9D are equivalent circuit diagrams showing second four states of charge-pump operation of the charge-pump circuit.
Figure 9B:
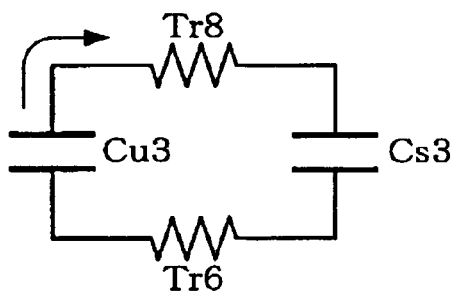
Figure 9C:
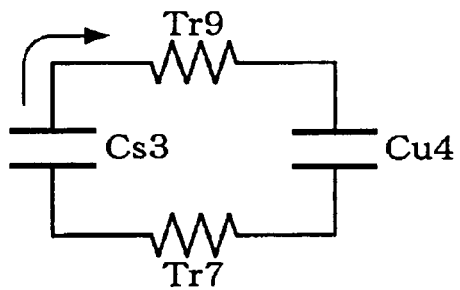
Figure 9D:
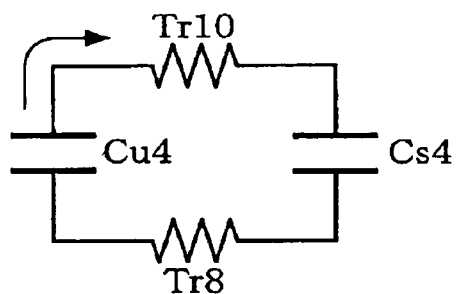

FIG. 9A is an equivalent circuit in which the MOS transistors Tr5 and Tr7 are turned ON. FIG. 9B is an equivalent circuit in which the MOS transistors Tr6 and Tr8 are turned ON. FIG. 9C is an equivalent circuit in which the MOS transistors Tr7 and Tr9 are turned ON. FIG. 9D is an equivalent circuit in which the MOS transistors Tr8 and Tr10 are turned ON.

The resistance of the ON resistance of each MOS transistor is denoted by r. The impedance is divided into a DC component and an AC component in each state shown in FIGS. 8A, 8B, 8C, 8D, 9A, 9B, 9C, and 9D.

The DC cmponent of the impedance in each state is made up of the ON resistance of two MOS transistors. Therefore, the DC component is 2r.

The current i which flows in each state is calculated as $i = cfV$. f stands for a switching frequency. Since the AC cmponent of the impedance occurs by switching between each state, the AC component is $1/(c \cdot f)$. Specifically, the AC component of the impedance becomes $1/(Cu1 \cdot f)$ by switching from the state shown in FIG. 8A to the state shown in FIG. 8B.

The AC component of the impedance becomes $1/(Cs1 \cdot f)$ by switching from the state shown in FIG. 8B to the state shown in FIG. 8C. The AC component of the impedance becomes $1/(Cu2 \cdot f)$ by switching from the state shown in FIG. 8C to the state shown in FIG. 8D. The AC component of the impedance becomes $1/(Cs2 \cdot f)$ by switching from the state shown in FIG. 8D to the state shown in FIG. 9A. The AC component of the impedance becomes $1/(Cu3 \cdot f)$ by switching from the state shown in FIG. 9A to the state shown in FIG. 9B. The AC component of the impedance becomes $1/(Cs3 \cdot f)$ by switching from the state shown in FIG. 9B to the state shown in FIG. 9C. The AC component of the impedance becomes $1/(Cu4 \cdot f)$ by switching from the state shown in FIG. 9C to the state shown in FIG. 9D.

The capacitance of each boost capacitor and each stabilization capacitor is c. Since the output impedance Z is the sum of the DC component and the AC component of the impedance, the output impedance Z is expressed by the following equation (2).

$$Z = 8 \times 2r + 7 \times 1/(c \cdot f) = 16r + 7/(c \cdot f) \qquad (2)$$

In the case of an N-fold boost, the general equation of the output impedance is expressed by the following equation (3).

$$Z = \{(2N-4) \times 2 + 4\} \times r + (2N-3)/(c \cdot f) \qquad (3)$$
$$= (4N-4)r + (2N-3)/(c \cdot f)$$

1.3 Comparative Example

A comparative example of a charge-pump circuit is described below for comparison with the charge-pump circuit 200 shown in FIG. 5.

Figure 10:
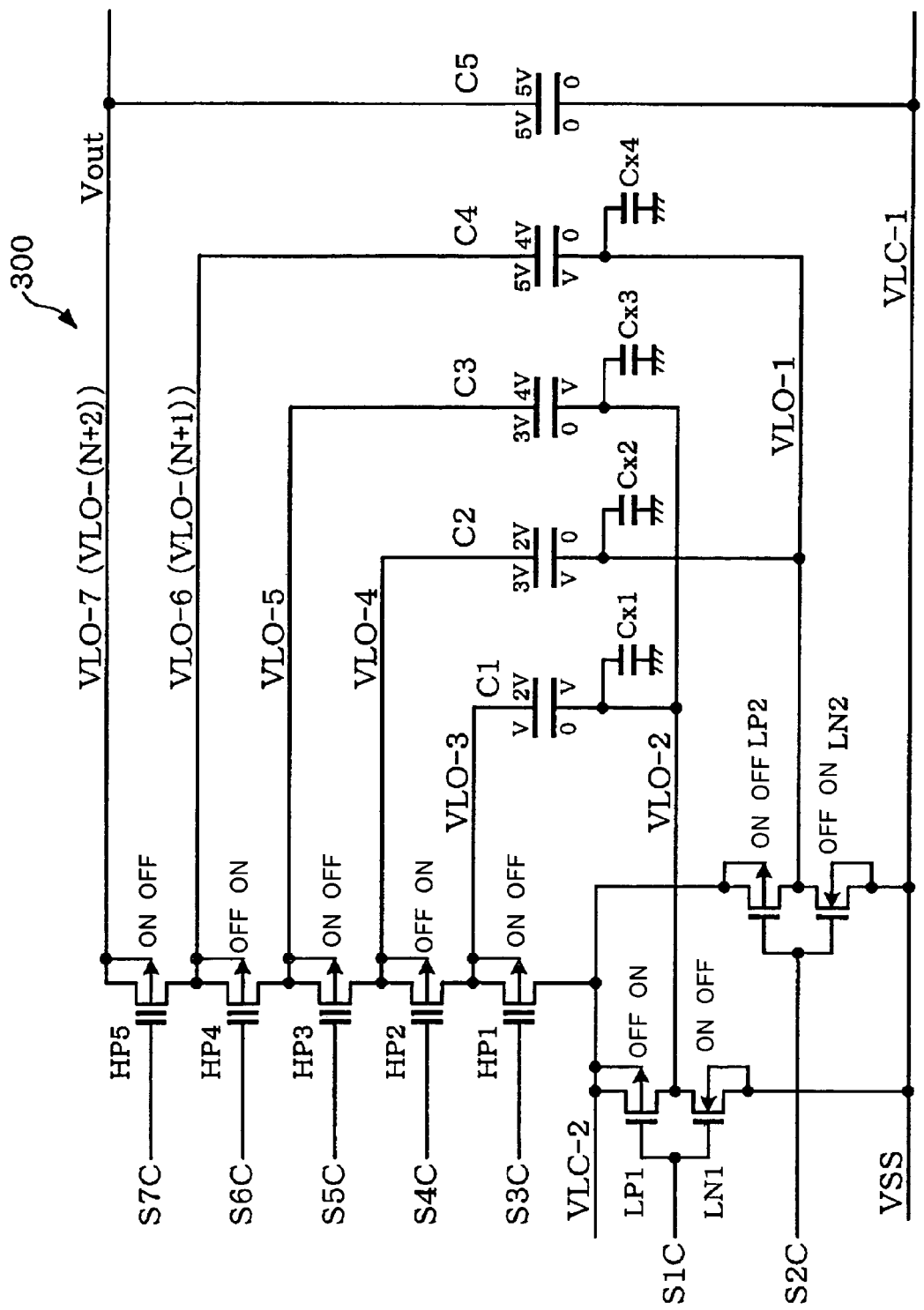
FIG. 10 a diagram showing the configuration of a charge-pump circuit in a comparative example.

FIG. 10 is a diagram showing the configuration of a charge-pump circuit in the comparative example. In FIG. 10, components that are the same as those of the charge-pump circuit 200 shown in FIG. 5 are denoted by the same reference numbers.

A charge-pump circuit 300 in the comparative example includes first and second power source lines VLC-1 and VLC-2, and first to (N+2)th output power source lines VLO-1 to VLO-(N+2). The charge-pump circuit 300 outputs the boosted voltage N×V obtained by multiplying the voltage V between the first and second power source lines VLC-1 and VLC-2 N times to the (N+2)th output power source line VLO-(N+2) as the output voltage Vout.

The charge-pump circuit 300 includes n-channel MOS transistors LN1 and LN2 and p-channel MOS transistors LP1 and LP2 as first to fourth low-voltage switching elements. The charge-pump circuit 300 includes p-channel MOS transistors HP1 to HPN as first to Nth high-voltage switching elements.

The MOS transistors LP1 and LN1 are connected in series between the first and second power source lines VLC-1 and VLC-2. The MOS transistors LP1 and LN1 are ON/OFF controlled by a boost clock signal S1C. The MOS transistors LP2 and LN2 are connected in series between the first and second power source lines VLC-1 and VLC-2. The MOS transistors LP2 and LN2 are ON/OFF controlled by the boost clock signal S2C.

The MOS transistors HP1 to HPN are connected in series between the second power source line VLC-2 and the (N+2)th output power source line VLO-(N+2). A drain terminal of the MOS transistors HP1 is connected with the second power source line VLC-2. A source terminal of the MOS transistor HPN is connected with the (N+2)th output power source line VLO-(N+2). The MOS transistors HP1 to HPN are ON/OFF controlled by boost clock signals S3C to S(N+2)C.

The first output power source line VLO-1 is connected with a drain terminal of the MOS transistor LN2 and a drain terminal of the MOS transistor LP2. The second output power source line. VLO-2 is connected with a drain terminal of the MOS transistor LN1 and a drain terminal of the MOS transistor LP1.

In the case where N is an odd number, a flying capacitor is connected between the second output power source line VLO-2 and the MOS transistor HPq (1≦q≦N, q is an even number). Therefore, (N−1)/2 flying capacitors are connected with the second output power source line VLO-2. A flying capacitor is connected between the first output power source line VLO-1 and the MOS transistor HPt (2≦t≦N, t is an odd number). Therefore, (N−1)/2 flying capacitors are connected with the first output power source line VLO-1.

In the case where N is an even number, a flying capacitor is connected between the second output power source line VLO-2 and the MOS transistors HPq (1≦q≦N, q is an even number). Therefore, N/2 flying capacitors are connected with the second output power source line VLO-2. A flying capacitor is connected between the first output power source line VLO-1 and the MOS transistor HPt (2≦t≦N, t is an odd number). Therefore, (N/2−1) flying capacitors are connected with the first output power source line VLO-1.

FIG. 10 shows the configuration example when N is five (when a voltage is multiplied five times). A capacitor C5 is connected between the seventh output power source line VLO-7 to which the output voltage Vout is output and the first power source line VLC-1 in order to stabilize the output voltage Vout.

In FIG. 10, the conducting state of each MOS transistor in the first and second periods is indicated by "ON" or "OFF" in the same manner as in FIG. 5. The conducting state in the first period is shown on the left, and the conducting state in the second period is shown on the right.

FIG. 10 also shows the voltage applied to each flying capacitor in the first and second periods. The voltage applied in the first period is shown on the left, and the voltage applied in the second period is shown on the right.

Figure 11:
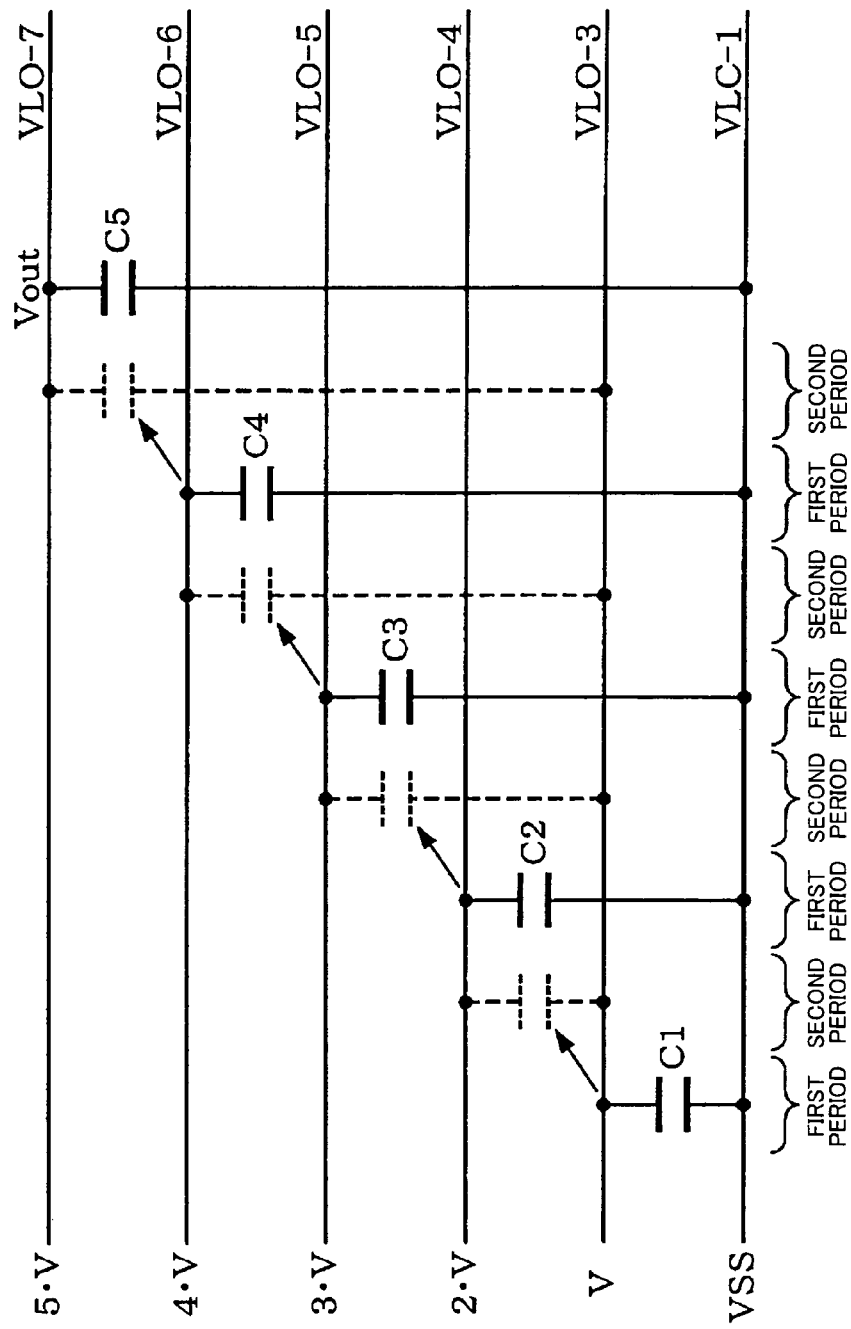
FIG. 11 is a diagram for illustrating the operation of the charge-pump circuit in the comparative example.

FIG. 11 is a diagram for illustrating the operation of the charge-pump circuit in the comparative example. As shown in this figure, a boosted voltage obtained by multiplying the voltage between the first and second power source lines VLC-1 and VLC-2 N times is output to the (N+2)th output power source line VLO-(N+2) (seventh output power source line VLO-7 in FIG. 11) as the output voltage Vout by using the charge-pump method in which the first and second periods are repeated.

The output impedance of the charge-pump circuit 300 in the comparative example is simply calculated as described below.

Figure 12A:
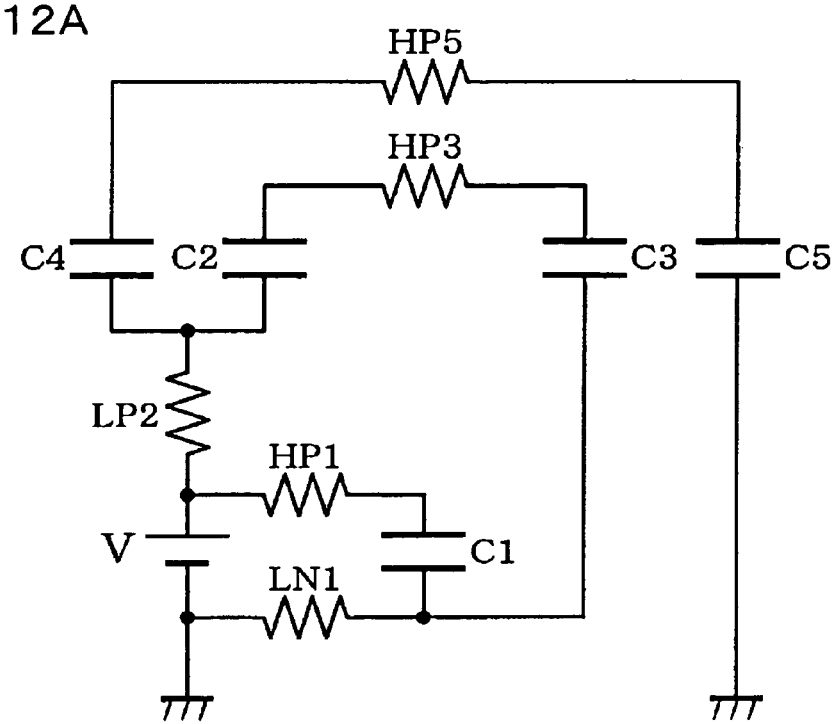
FIGS. 12A and 12B are equivalent circuit diagrams of the charge-pump circuit in the comparative example.
Figure 12B:
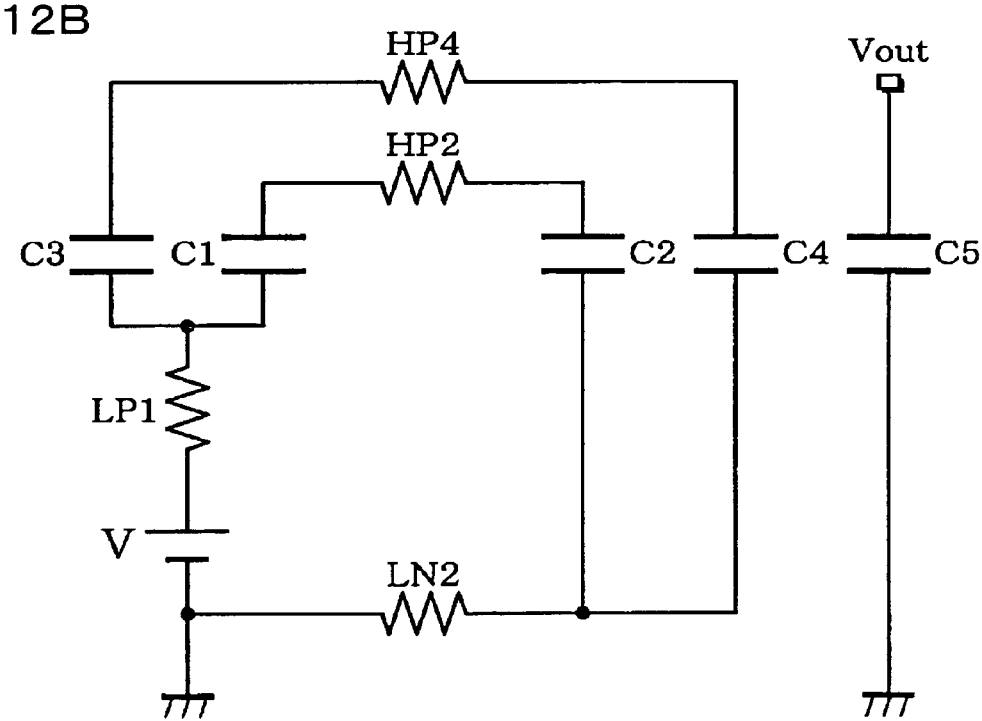

FIGS. 12A and 12B show equivalent circuits of the charge-pump circuit 300 in the comparative example. FIG. 12A shows an equivalent circuit of the charge-pump circuit 300 in the first period. FIG. 12B shows an equivalent circuit of the charge-pump circuit 300 in the second period. A resistance element is each equivalent circuit shows the ON resistance of the MOS transistor. A power supply in each equivalent circuit shows that the voltage V is applied between the first and second power source lines VLC-1 and VLC-2.

Five states of the charge-pump operation of the charge-pump circuit 300 are considered below by using equivalent circuits. The impedance in each state is then calculated.

FIGS. 13A, 13B, 13C, 13D, and 13E show equivalent circuits of the five states of the charge-pump operation of the charge-pump circuit 300.

Figure 13A:
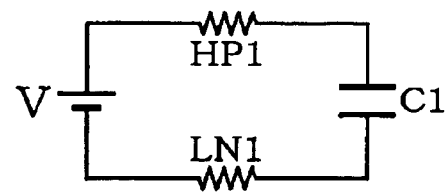
FIGS. 13A, 13B, 13C, 13D, and 13E are equivalent circuit diagrams showing five states of charge-pump operation of the charge-pump circuit in the comparative example.
Figure 13B:
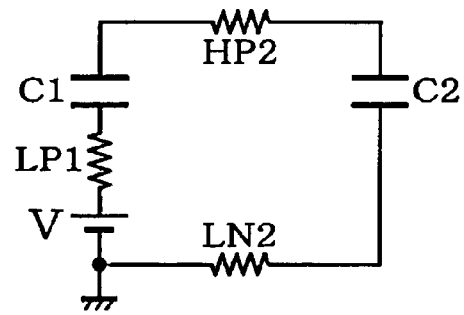
Figure 13C:
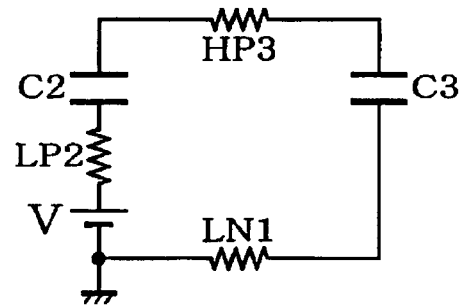
Figure 13D:
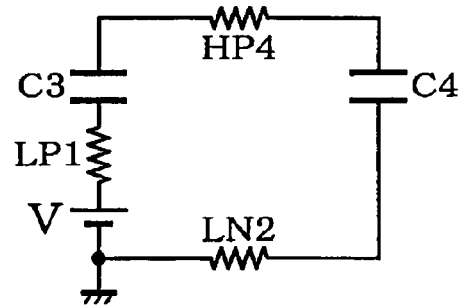
Figure 13E:
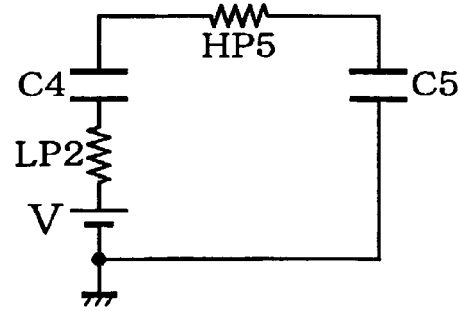

FIG. 13A is an equivalent circuit in which the MOS transistors HP1 and LN1 are turned ON. FIG. 13B is an equivalent circuit in which the MOS transistors HP2 and LN2 are turned ON. FIG. 13C is an equivalent circuit in which the MOS transistors HP3 and LN1 are turned ON. FIG. 13D is an equivalent circuit in which the MOS transistors HP4 and LN2 are turned ON. FIG. 13E is an equivalent circuit in which the MOS transistors HP5 and LP2 are turned ON.

The resistance of the ON resistance of each MOS transistor is r. The impedance is divided into a DC component and an AC component in each state shown in FIGS. 13A, 13B, 13C, 13D, and 13E.

The DC component of the impedance in each state shown in FIGS. 13A and 13E is 2r. The DC component of the impedance in each state shown in FIGS. 13B, 13C, and 13D is 3r.

The AC component of the impedance is calculated in the same manner as described above. Specifically, the AC component of the impedance becomes 1/(C1•f) by switching from the state shown in FIG. 13A to the state shown in FIG. 13B. The AC component of the impedance becomes 1/(C2•f) by switching from the state shown in FIG. 13B to the state shown in FIG. 13C. The AC component of the impedance becomes 1/(C3•f) by switching the state shown in FIG. 13C to the state shown in FIG. 13D. The AC components of the impedance becomes 1/(C4•f) by switching from the state shown in FIG. 13D to the state shown in FIG. 13E.

The capacitance of each flying capacitor is c. Since the output impedance Zc is the sum of the DC component and the AC component of the impedance, the output impedance Zc is expressed by the following equation (4). The AC component of the capacitor C5 also occurs by the load connected with the seventh output power source line VLO-7. However, the capacitor C5 is provided as an external capacitor, and has a capacitance sufficiently greater than the capacitance of the flying capacitors C1 and C4. Therefore, the flying capacitors C1 to C4 become dominant as the impedance, and the AC component of the capacitor C5 can be ignored.

$$Zc=(2\times 2r+3\times 3r)+4\times 1/(c\cdot f)=13r+4/(c\cdot f) \qquad (4)$$

When the voltage is multiplied N times, the general equal of the output impedance is expressed by the following equation (5).

$$Zc = \{2\times 2r + (N-2)\times 3r\} + (N-1)/(c\cdot f) \qquad (5)$$
$$= (3N-2)r + (N-1)/(c\cdot f)$$

1.4 Comparison with comparative example

The configuration of the charge-pump circuit 200 in this embodiment shown in FIG. 5 is compared with the configuration of the charge-pump circuit 300 in the comparative example shown in FIG. 10. These circuits implement voltage boosting by multiplying a voltage five times. However, the number of capacitors and the number of switching elements are greater in the charge-pump circuit 200.

The output impedance Z of the charge-pump circuit 200 in this embodiment shown in FIG. 5 is compared with the output impedance Zc of the charge-pump circuit 300 in the comparative example shown in FIG. 10. As is clear from the equations (2) and (4), the output impedance Zc is smaller than the output impedance Z.

Therefore, it is generally advantageous to employ the charge-pump circuit 300 in the comparative example instead of the charge-pump circuit 200 in this embodiment.

However, in the case where the capacitors of the charge-pump circuit are provided in the semiconductor device, all the boost capacitors and stabilization capacitors of the charge-pump circuit 200 in this embodiment can be manufactured by a low-voltage manufacturing process. On the other hand, the MOS transistors HP1 to HP5 and the flying capacitors C2 to C5 of the charge-pump circuits 300 in the comparative example must be manufactured by a high-voltage resistant manufacturing process.

The low voltage used herein is determined by the design rule based on the voltage V (1.8 to 3.3 V, for example) between the first and second power source lines VLC-1 and VLC-2 (VL-1 and VL-2). The high voltage used herein means a higher voltage determined by the design rule, and it is a voltage of 10 to 20 V, for example.

The film thickness between the electrodes of the capacitor formed in the semiconductor device differs depending on whether the low-voltage manufacturing process or the high-voltage resistant manufacturing process is used. The film thickness between the electrodes of the capacitor formed by the low-voltage manufacturing process can be further reduced, whereby the capacitance per unit area can be increased. Specifically, the area of the capacitor formed by the low-voltage manufacturing process can be made smaller than the area of the capacitor formed by the high-voltage resistant manufacturing process in order to obtain a certain capacitance. Moreover, the influence of an increase in the number of capacitors can be reduced assuming that the capacitors are provided in the semiconductor device.

Therefore, in the case of providing the capacitors in the same area of the semiconductor device, the charge-pump circuit 200 in this embodiment is more advantageous than the charge-pump circuit 300 in the comparative example.

The following advantages are obtained by providing the capacitors of the charge-pump circuit 200 in this embodiment in the semiconductor device.

Since the MOS transistor as the switching element can be manufactured by using the low-voltage manufacturing process, the charge/discharge current due to the gate capacitance of the MOS transistor can be reduced. Since the channel width of the low-voltage MOS transistor can be reduced in comparison with a high-voltage resistant MOS transistor which implements the same ON resistance, the charge/discharge voltage is low as shown in FIG. 5. On the contrary, the charge/discharge voltage in FIG. 10 is V to 5×V, and 5×V is a high voltage. Therefore, the charge/discharge current due to the gate capacitance can be reduced by employing the low-voltage MOS transistor, even if the gate capacitance is increased due to a decrease in the gate film thickness.

In the case of forming the capacitors in the semiconductor device in the same area (same cost) and obtaining the same output impedance (same capability) for the charge-pump circuit 200 in this embodiment and the charge-pump circuit 300 in the comparative example, current consumption accompanying switching can be reduced by the charge-pump circuit 200 in this embodiment in comparison with the charge-pump circuit 300 in the comparative example.

This advantage is described below. Since a sufficient time is necessary for charging the capacitor of the charge-pump circuit, the time constant C·r is sufficiently smaller than ½f (charge/discharge frequency). The time constant C·r is assumed to be one-tenth of the pulse of the boost clock signal, for example. The capacitances of the capacitors of the charge-pump circuit 200 and the charge-pump circuit 300 are assumed to be the same, and the values of the ON resistance of the MOS transistors are assumed to be the same.

$$C\cdot r=1/(20\cdot f) \qquad (6)$$

Therefore, substituting the equation (6) in the equations (2) and (4) yields the following equations (7) and (8).

$$Z=13/(20\cdot Ca\cdot fa)+4/(Ca\cdot fa) \qquad (7)$$

$$Zc=16/(20\cdot Cb\cdot fb)+7/(Cb\cdot fb) \qquad (8)$$

In the equations (7) and (8), Ca is the capacitance of one capacitor in the charge-pump circuit 300, and Cb is the capacitance of one capacitor in the charge-pump circuit 200. fa is the charge/discharge frequency of each capacitor in the charge-pump circuit 300, and fb is the charge/discharge frequency of each capacitor in the charge-pump circuit 200.

In order to equalize the output impedance Z of the charge-pump circuit 200 and the output impedance Zc of the charge-pump circuit 300, Z=Zc from the equations (7) and (8). Therefore, the following equation (9) is obtained.

$$Cb\cdot fb=(7.8/4.65)\cdot Ca\cdot fa=1.68\cdot Ca\cdot fa \qquad (9)$$

The film thickness of an insulating oxide film when manufacturing a capacitor CLV by the low-voltage manufacturing process is 10 nm, and the film thickness of an insulating oxide film when manufacturing a capacitor CHV by the high-voltage resistant manufacturing process of 16 V is 55 nm, for example. In this case, the capacitance ratio per unit area is expressed by the following equation (10).

$$CLV = 5.5 \cdot CHV \quad (10)$$

In the charge-pump circuit 300 shown in FIG. 10, it is necessary that only the flying capacitor C1 is for a low voltage, and the flying capacitors C2 to C4 are resistant to a high voltage. Therefore, in order to equalize the capacitances of all the capacitors, the area of the capacitors is as follows when the entire area is S.

$$\text{Area of low-voltage capacitor: } 0.057 \cdot S \quad (11)$$

$$\text{Area of each high-voltage capacitor: } 0.314 \cdot S \quad (12)$$

In the charge-pump circuit 200 shown in FIG. 5, since it suffices that all the eight boost capacitors and stabilization capacitors are for a low voltage, the area of the capacitors is as follows when the entire area is S.

$$\text{Area of low-voltage capacitor: } 0.125 \cdot S \quad (13)$$

Therefore, in order to implement the sum of the capacitance Ca of one capacitor of the charge-pump circuit 300 and the capacitance Cb of one capacitor of the charge-pump circuit 200 in the same area, the following relational equation is obtained.

$$Cb = (0.125/0.057) \cdot Ca = 2.19 \cdot Ca \quad (14)$$

The relationship between fb and fa is expressed by the following equation (15) by substituting the equation (14) in the equation (9).

$$fb = 0.77 \cdot fa \quad (15)$$

The equation (15) shows that the charge/discharge frequency fb of the charge-pump circuit 200 in this embodiment is 0.77 times the charge/discharge frequency fa of the charge-pump circuit 300 in the comparative example. Therefore, the charge/discharge frequency can be reduced. Specifically, current consumption accompanying switching of the switching element can be reduced due to reduction of the frequency of the boost clock signal.

The third advantage obtained by providing the capacitors of the charge-pump circuit 200 in this embodiment in the semiconductor device is as follows.

Specifically, in the case of forming the capacitors in the same area of the semiconductor device (same cost) and obtaining the same output impedance (same capability) for the charge-pump circuit 200 in this embodiment and the charge-pump circuit 300 in the comparative example, the charge/discharge current due to the parasitic capacitance of the capacitor can be reduced by the charge-pump circuit 200 in this embodiment in comparison with the charge-pump circuit 300 in the comparative example.

Figure 14:
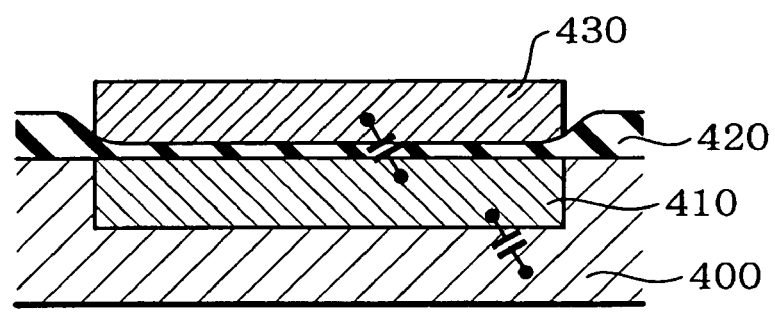
FIG. 14 is a diagram for illustrating a parasitic capacitance of a capacitor in a semiconductor device.

FIG. 14 is a diagram for illustrating the parasitic capacitance of the capacitor provided in the semiconductor device. In the case of providing the capacitor in the semiconductor device, an n-type well region 410 (impurity region in a broad sense) is formed in an a p-type silicon substrate 400 (semiconductor substrate in a broad sense) which makes up the semiconductor device. An insulating oxide film 420 (insulating layer in a broad sense) is formed on the n-type well region 410. A polysilicon film 430 (conductive layer in a broad sense) is formed on the insulating oxide film 420.

A capacitor is formed by the n-type well region 410 the insulating oxide film 420, and the polysilicon film 430. A junction capacitance between the p-type silicon substrate 400 and the n-type well region 410 becomes the parasitic capacitance.

In the charge-pump circuit 300 in the comparative example, a voltage ΔV is charged/discharged to or from all the capacitors C1 to C4 as the flying capacitors, as shown in FIG. 10. In FIG. 10, the parasitic capacitances of the capacitors C1 to C4 are denoted by Cx1 to Cx4. If the parasitic capacitance per unit area is Ci, the charge/discharge current Ia due to the parasitic capacitance is expressed by the following equation.

$$Ia = Ci \cdot S \cdot V \cdot fa \quad (16)$$

In the charge-pump circuit 200 in this embodiment, the stabilization capacitors are not repeatedly charged/discharged, and only the boost capacitors are repeatedly charged/discharged. Therefore, the parasitic capacitances of four capacitors among the eight capacitors generate the charge/discharge current. In FIG. 5, the parasitic capacitances of the first to fourth boost capacitors Cu1 to Cu4 are denoted by Cy1 to Cy4. The charge/discharge current Ib by the parasitic capacitances Cy1 to Cy4 of the first to fourth boosting capacitors Cu1 to Cu4 is expressed by the following equation.

$$Ib = Ci \cdot (S/2) \cdot V \cdot fb \quad (17)$$

The relationship between Ia and Ib is calculated from the equations (16) and (17), and substituting the equation (15) yields the following equation.

$$Ib = Ia/2 = 0.38 \cdot Ia \quad (18)$$

The equation (18) shows that the charge/discharge current Ib of the parasitic capacitance of the capacitor of the charge-pump circuit 200 in this embodiment is 0.38 times the charge/discharge current Ia of the parasitic capacitance of the capacitor of the charge-pump circuit 300 in the comparative example. Therefore, according to this embodiment, the charge/discharge current due to the parasitic capacitance of the capacitor can be significantly reduced.

As described above, current consumption can be significantly reduced in comparison with the charge-pump circuit 300 in the comparative example by providing the capacitors in the configuration of this embodiment in the semiconductor device.

2. Boost clock generation circuit

The charge-pump circuit according to one embodiment of the present invention can reduce current consumption even if the capacitors are provided in the semiconductor device. However, the number of switching elements increases. The influence of an increase in the number of switching elements can be reduced by providing the charge-pump circuit in the semiconductor device.

In the charge-pump circuit in this embodiment, the number of boost clock signals for controlling the switching elements is increased accompanying an increase in the number of switching elements. In the charge-pump circuit, the switching elements must be controlled by the boost clock signals so that the switching elements connected in series are not turned ON at the same time in order to reduce current consumption. Specifically, in this embodiment, it is necessary to generate the boost clock signals so that the rising time and the falling time of two boost clock signals for controlling two switching elements connected in series between two power source lines do not coincide with each other. Therefore, a delay time may be created by using a delay cell so that the rising time and the falling time of the boost clock signals do not coincide with each other, for example.

However, since the number of boost clock signals is increased in the charge-pump circuit in this embodiment, an increase in the number of delay cells for generating the boost clock signals cannot be ignored, whereby the circuit scale is increased.

Therefore, in this embodiment, an increase in the circuit scale is prevented by generating the boost clock signals as described below.

Figure 15:
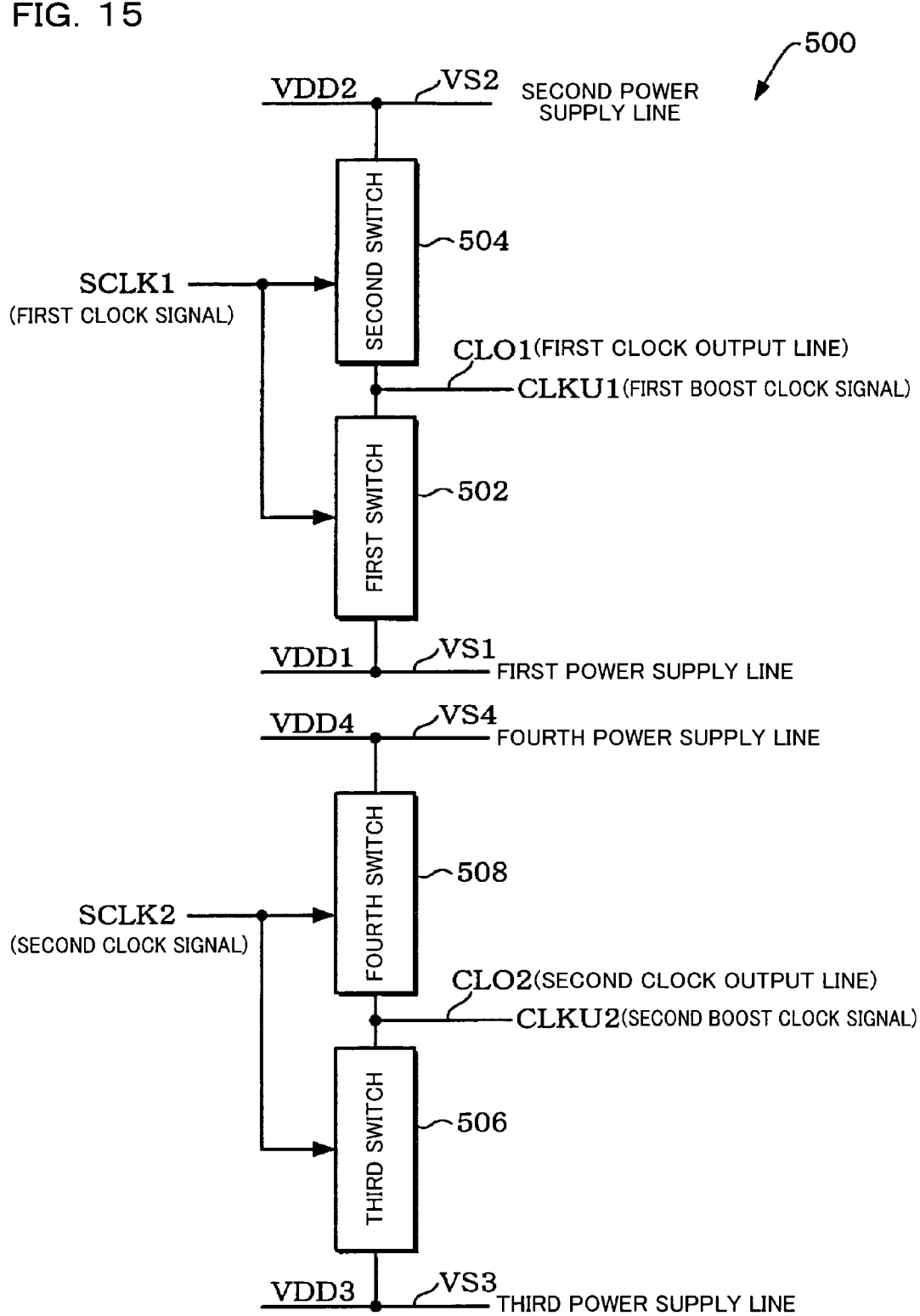
FIG. 15 is a diagram showing a boost clock generation circuit according to one embodiment of the present invention.

FIG. 15 is a diagram showing a boost clock generation circuit according to one embodiment of the present invention. Following is description of the configuration of a boost clock generation circuit which generates two boost clock signals. However, a boost clock generation circuit which generates two or more boost clock signals may be configured similarly.

A boost clock generation circuit 500 in this embodiment includes first to fourth switch circuits 502, 504, 506, and 508.

The first switch circuit 502 is connected between a first power supply line VS1 to which a first power supply voltage VDD1 is supplied and a first clock output line CLO1 to which a first boost clock signal CLKU1 is output.

The second switch circuit 504 is connected between a second power supply line VS2 to which a second power supply voltage VDD2 is supplied and the first clock output line CLO1.

The third switch circuit 506 is connected between a third power supply line VS3 to which a third power supply voltage VDD3 is supplied and a second clock output line CLO2 to which a second boost clock signal CLKU2 is output.

The fourth switch circuit 508 is connected between a fourth power supply line VS4 to which a fourth power supply voltage VDD4 is supplied and the second clock output line CLO2.

The first and second switch circuits 502 and 504 are ON/OFF controlled based on the first clock signal SCLK1 so that one of the first and second circuits 502 and 504 is exclusively turned ON. The third and fourth switch circuits 506 and 508 are ON/OFF controlled based on the second clock signal SCLK2 so that one of the third and fourth switch circuits 506 and 58 is exclusively turned ON.

The boost clock generation circuit 500 is configured so that the level of current drive capability of the first switch circuit 502 in an ON state (current drive capability of the first switch circuit 502; hereinafter the same) differs from the level of current drive capability of the third switch circuit 506 in an ON state. The boost clock generation circuit 500 is configured so that the current drive capability of the second switch circuit 504 in an ON state differs from the current drive capability of the fourth switch circuit 508 in an ON state.

This allows the rising period and the falling period of the first boost clock signal CLKU1 do not coincide with the rising period and the falling period of the second boost clock signal CLKU2.

Figure 16:
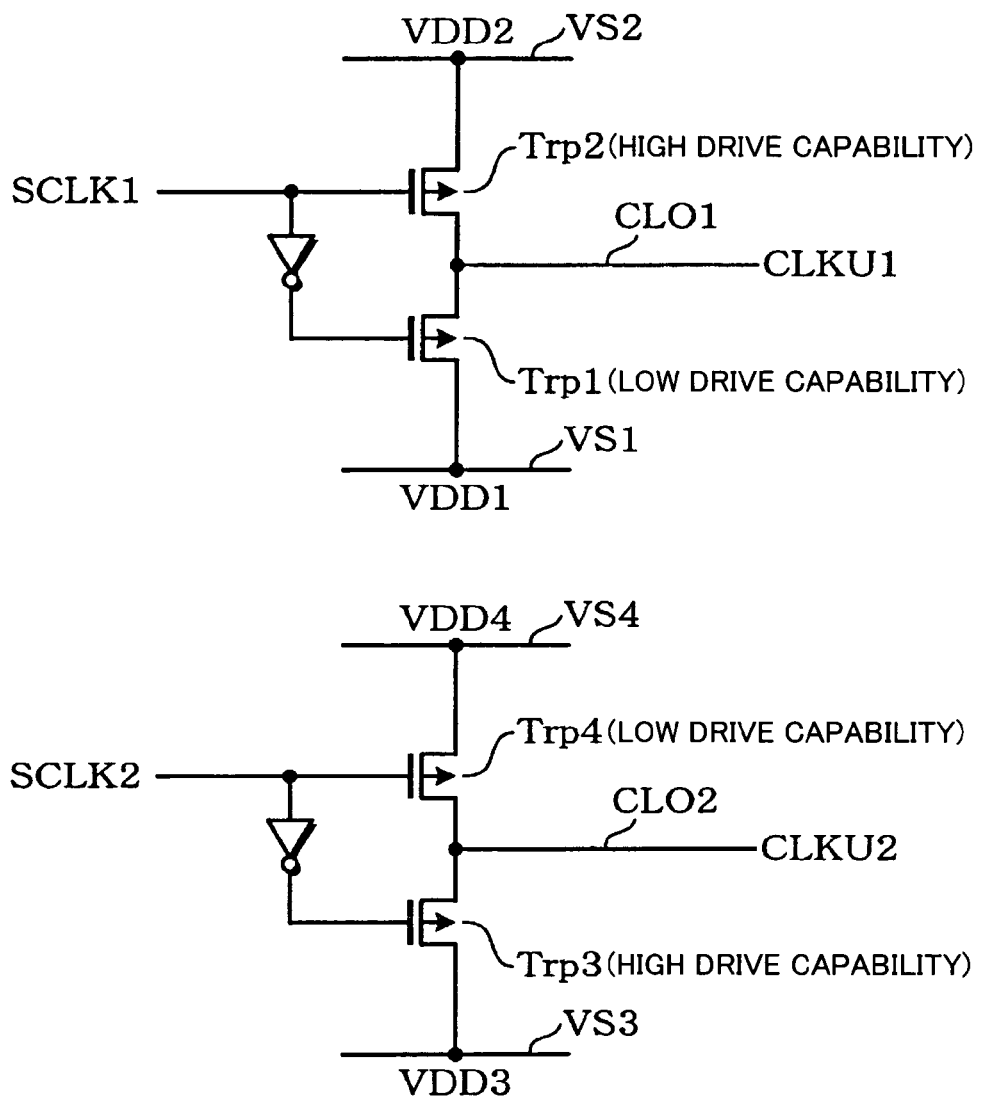
FIG. 16 is a circuit diagram showing an example of the configuration of the boost clock generation circuit according to one embodiment of the present invention.

FIG. 16 shows an example of the configuration of the boost clock generation circuit. Note that components that are the same as those of the boost clock generation circuit 500 shown in FIG. 15 are denoted by the same reference numbers and further description thereof is omitted.

In this figure, the second power supply voltage VDD2 is higher than the first power supply voltage VDD1, and the fourth power supply voltage VDD4 is higher than the third power supply voltage VDD3. The first and second clock signals SCLK1 and SCLK2 are in the same phase.

In FIG. 16, the first to fourth switch circuits 502, 504, 506, and 508 are formed by p-channel MOS transistors Trp1 to Trp4, respectively. The first clock signal SCLK1 is supplied to a gate terminal of the MOS transistor Trp2 as the second switch circuit 504, and an inverted signal of the first clock signal SCLK1 is supplied to gate terminal of the MOS transistor Trp1 as the first switch circuit 502. This allows the MOS transistors Trp1 and Trp2 as the first and second switch circuits 502 and 504 to be controlled so that one of the MOS transistors Trp1 and Trp2 is exclusively turned ON.

The second clock signal SCLK2 is supplied to a gate terminal of the MOS transistors Trp4 as the fourth switch circuit 508, and an inverted signal of the second clock signal SCLK2 is supplied to a gate terminal of the MOS transistor Trp3 as the third switch circuit 506. This allows the MOS transistors Trp3 and Trp4 as the third and fourth switch circuits 506 and 508 to be controlled so that one of the MOS transistors Trp3 and Trp4 is exclusively turned ON.

The boost clock generation circuit is configured so that the current drive capability of the first switch circuit 502 (MOS transistor Trp1) is smaller than the current drive capability of the third switch circuit 506 (MOS transistor Trp3). This allows the falling time of the first boost clock signal CLKU1 to differ from the falling time of the second boost clock signal CLKU2.

The falling time used herein is the period of time from the time at which the voltage level reaches 90% of the maximum value to the time at which the voltage level reaches 10% of the maximum value.

If the channel width and the channel length of the MOS transistor are respectively denoted by W and L, the level of current drive capability of the MOS transistor is associated with the value V/L. The greater the value V/L, the larger the current drive capability.

The boost clock generation circuit is configured so that the level of current drive capability of the second switch 504 (MOS transistor Trp2) is higher than the level of current drive capability of the fourth switch circuit 508 (MOS transistor Trp4). This allows the rising time of the first boost clock signal CLKU1 to differ from the rising time of the second boost clock signal CLKU2.

The rising time used herein is the period of time from the time at which the voltage level reaches 10% of the maximum value to the time at which the voltage level reaches 90% of the maximum value.

Figure 17:
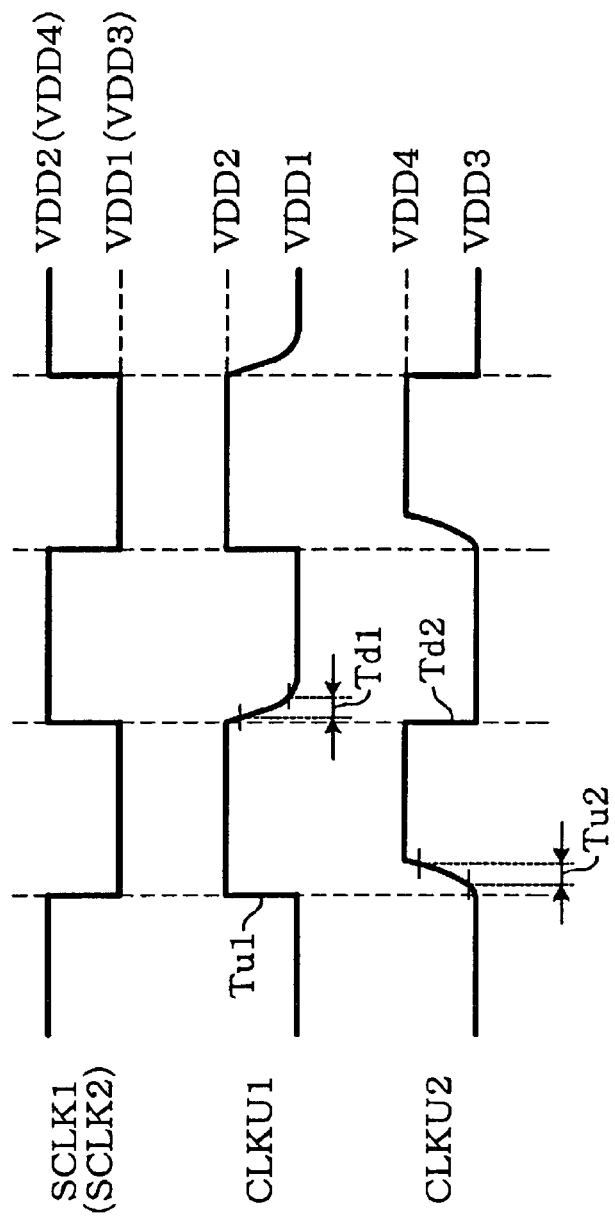
FIG. 17 shows an example of timing of the boost clock generation circuit shown in FIG. 16.

FIG. 17 shows an example of timing of the boost clock generation circuit shown in FIG. 16.

The first clock signal SCLK1 repeats the voltage level of the first power supply voltage VDD1 and the voltage level of the second power supply voltage VDD2. The second clock signal CLK2 repeats the voltage level of the third power supply voltage VDD3 and the voltage level of the fourth power supply voltage VDD4.

When the first clock signal SCLK1 falls to the voltage level of the first power supply voltage VDD1 from the voltage level of the second power supply voltage VDD2, the MOS transistor Trp1 is turned OFF, the MOS transistor Trp2 is turned ON, the MOS transistor Trp3 is turned OFF, and the MOS transistor Trp4 is turned ON.

Since the current drive capability of the MOS transistor Trp2 is large, the voltage level of the first boost check signal CLKU1 reaches the second power supply voltage VDD2 of the second power supply line VS2 approximately at the same time (rising time Tu1) as the fall timing of the first clock signal SCLK1. Since the current drive capability of the MOS transistors Trp4 is small, the voltage level of the second boost clock signal CLKU2 reaches the fourth power supply voltage VDD4 of the fourth power supply line VS4 from the third power supply voltage VDD3 of the third power supply line VS3 after a delay (rising time Tu2) from the fall timing of the second clock signal SCLK2 (first clock signal SCLK1).

Therefore, since the current drive capability of the MOS transistor Trp2 is larger than the current drive capability of the MOS transistor Trp4, the rising time Tu1 of the first boost clock signal CLKU1 can be allowed to differ from the rising time Tu2 of the second boost clock signal CLKU2.

When the first clock signal SCLK1 rises to the voltage level of the second power supply voltage VDD2 from the voltage level of the first power supply voltage VDD1, the MOS transistor Trp1 is turned ON, the MOS transistor Trp2 is turned OFF, the MOS transistor Trp3 is turned ON, and the MOS transistor Trp4 is turned OFF. Since the current drive capability of the MOS transistor Trp1 is small, the voltage level of the first boost clock signal CLKU1 reaches the first power supply voltage VDD1 of the first power supply line VS 1 after a delay (falling time Td1) from the rise timing of the first clock signal SCLK1. Since the current drive capability of the MOS transistor Trp3 is large, the voltage level of the second boost clock signal CLKU2 reaches the third power supply voltage VDD3 of the third power supply line VS3 from the fourth power supply voltage VDD4 of the fourth power supply line VS4 approximately at the same time (falling time Td2) as the rise timing of the second clock signal SCLK2 (first clock signal SCLK1).

Therefore, since the current drive capability of the MOS transistor Trp1 is smaller than the current drive capability of the MOS transistor Trp3, the falling time Td1 of the first boost clock signal CLKU1 can be allowed to differ from the falling time Td2 of the second boost clock signal CLKU2.

As described above, the rising time and the falling time of the first and second boost clock signals CLKU1 and CLKU2 can be allowed to differ with respect to the rising edge and the falling edge of the first and second clock signals SCLK1 and SCLK2.

The first and second boost clock signals generated by the host clock generation circuit shown in FIG. 16 are supplied to the gate terminals of the n-channel MOS transistor and the p-channel MOS transistor which make up the charge-pump circuit and are connected in series between two power source lines. This prevents the two MOS transistors from being turned ON at the same time, whereby the shoot-through current can be reduced.

Figure 18:
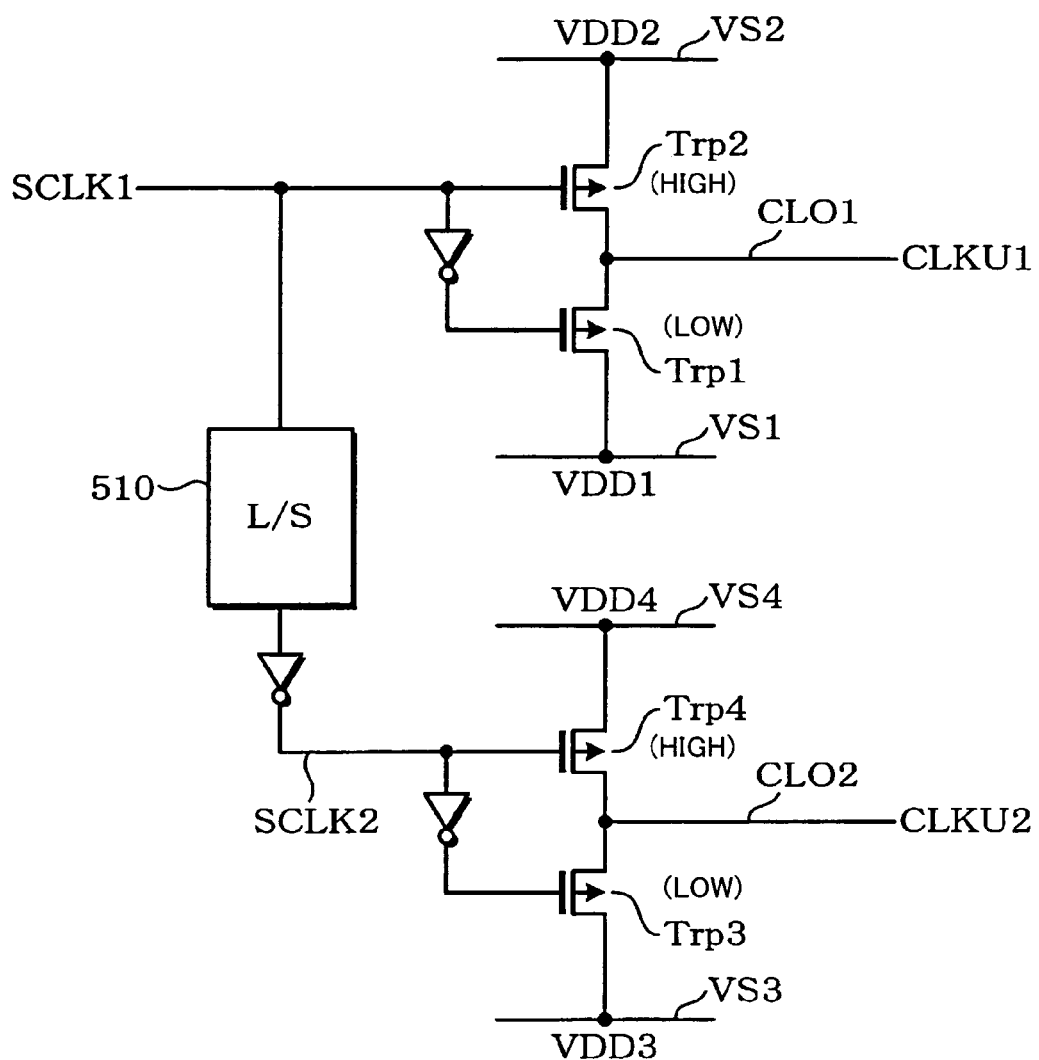
FIG. 18 is a circuit diagram showing another example of the configuration of the boost clock generation circuit according to one embodiment of the present invention.

FIG. 18 shows another example of the configuration of the boost clock generation circuit. Note that components that are the same as those of the boost clock generation circuit 500 shown in FIG. 16 are denoted by the same reference numbers and further description thereof is omitted.

In this figure, the second power supply voltage VDD2 is higher than the first power supply voltage VDD1, and the fourth power supply voltage VDD4 is higher than the third power supply voltage VDD3 in the same manner as in FIG. 16. However, the first and second clock signals SCLK1 and SCLK2 are in reverse phase.

In FIG. 18, the first clock signal SCLK1 is supplied to the gate terminal of the MOS transistor Trp2, and the inverted signal of the first clock signal SCLK1 is supplied to the gate terminal of the MOS transistor Trp1.

The first clock signal SCLK1 is also supplied to a level shifter (L/S) 510. The level shifter 510 converts the first clock signal SCLK which alternately repeats the voltage levels of the first and second power supply voltages VDD1 and VDD2 into a clock signal which alternately repeats the voltage levels of the third and fourth power supply voltages VDD3 and VDD4. The logical level of the clock signal is reversed by an inversion circuit. The output from the inversion circuit becomes the second clock signal SCLK2. Specifically, the first and second clock signals SCLK1 and SCLK2 become clock signals in reverse phase.

The second clock signal SCLK2 is supplied to the gate terminal of the MOS transistor Trp4, and the inverted signal of the second clock signal SCLK2 is supplied to the gate terminal of the MOS transistor Trp3.

In FIG. 18, the boost clock generation circuit is configured so that the current drive capability of the first switch circuit 502 (MOS transistor Trp1) is smaller than the current drive capability of the fourth switch circuit 508 (MOS transistor Trp4). This allows the falling time of the first boost clock signal CLKU1 to differ from the rising time of the second boost clock signal CLKU2.

The boost clock generation circuit is configured so that the current drive capability of the second switch circuit 504 (MOS transistor Trp2) is larger than the current drive capability of the third switch circuit 506 (MOS transistor Trp3). This allows the rising time of the first boost clock signal CLKU1 to differ from the falling time of the second boost clock signal CLKU2.

Figure 19:
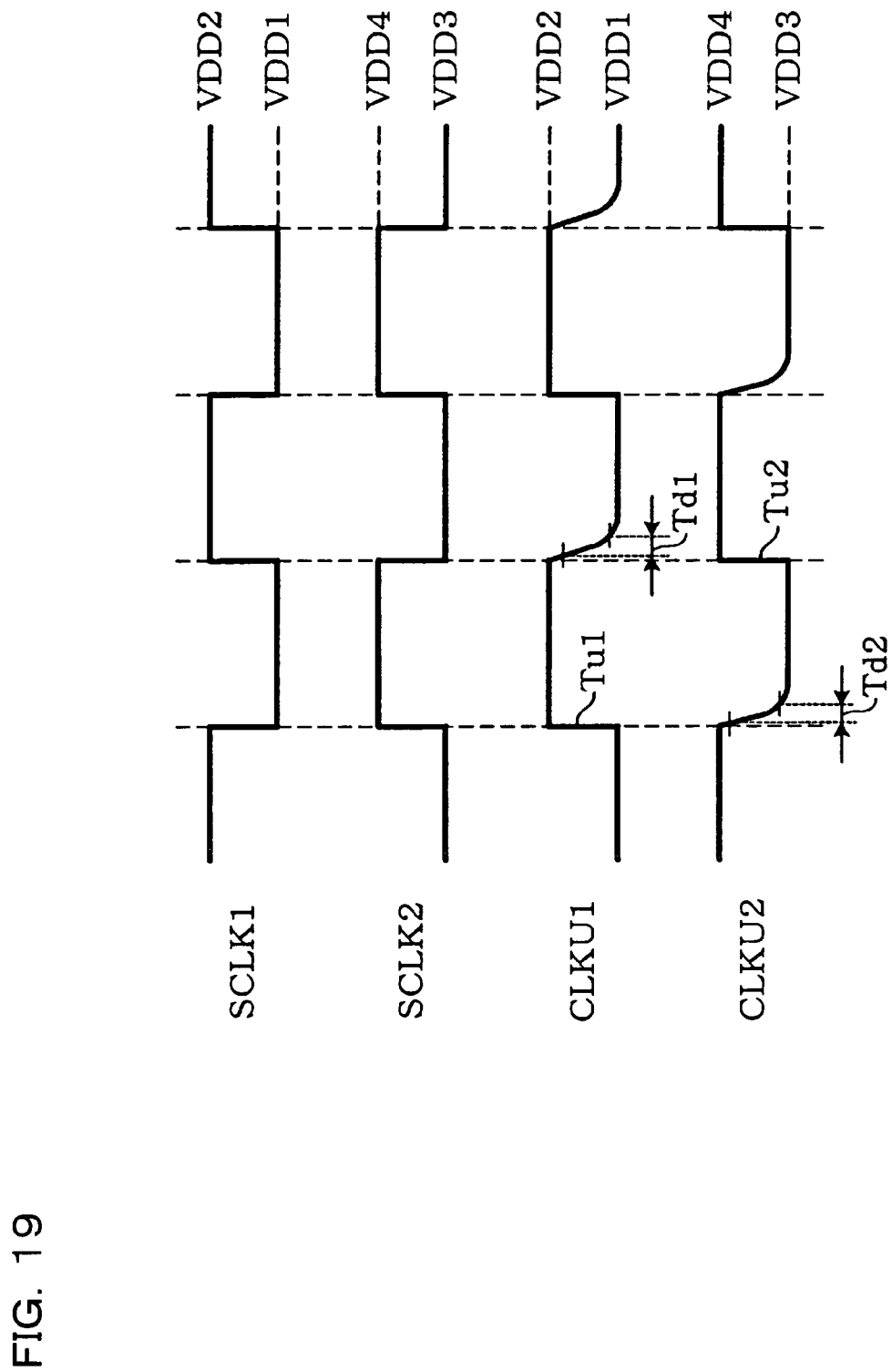
FIG. 19 shows an example of timing of the boost clock generation circuit shown in FIG. 18.

FIG. 19 shows an example of timing of the boost clock generation circuit shown in FIG. 18.

When the first clock signal SCLK1 falls to the voltage level of the first power supply voltage VDD1 from the voltage level of the second power supply voltage VDD2, the second clock signal SCLK2 which is in reverse phase with the first clock signal SCLK 1 rises to the voltage level of the fourth power supply voltage VDD4 from the voltage level of the third power supply voltage VDD3. Therefore, the MOS transistor Trp1 is turned OFF, the MOS transistor Trp2 is turned ON, the MOS transistor Trp3 is turned ON, and the MOS transistor Trp4 is turned OFF.

Since the current drive capability of the MOS transistor Trp2 is large, the voltage level of the first boost clock signal CLKU1 reaches the second power supply voltage VDD2 of the second power supply line VS2 approximately at the same time (rising time Tu1) as the fall timing of the first clock signal SCLK1. Since the current drive capability of the MOS transistor Trp3 is small, the voltage level of the second boost clock signal CLKU2 reaches the voltage level of the third power supply voltage VDD3 of the third power supply line VS3 from the voltage level of the fourth power supply voltage VDD4 of the fourth power supply line VS4 after a delay (falling time TD2) from the rise timing of the second clock signal SCLK2.

Therefore, since the current drive capability of the MOS transistor Trp2 is larger than the current drive capability of the MOS transistor Trp3, the rising time Tu1 of the first boost clock signal CLKU1 can be allowed to differ from the falling time Td2 of the second boost clock signal CLKU2.

When the first clock signal SCLK1 rises to the voltage level of the second power supply voltage VDD2 from the voltage level of the first power supply voltage VDD1, the second clock signal SCLK2 falls to the voltage level of the third power supply voltage VDD3 from the voltage level of the fourth power supply voltage VDD4. Therefore, the MOS transistor Trp1 is turned ON, the MOS transistor Trp2 is turned OFF, the MOS transistor Trp3 is turned OFF, and the MOS transistor Trp4 is turned ON.

Since the current drive capability of the MOS transistor Trp1 is small, the voltage level of the first boost clock signal CLKU1 reaches the first power supply voltage VDD1 of the first power supply line VS1 after a delay (falling time Td1) from the rise timing of the first clock signal SCLK1. Since the current drive capability of the MOS transistors Trp4 is large, the voltage level of the second boost clock signal CLKU2 reaches the voltage level of the fourth power supply voltage VDD4 of the fourth power supply line VS4 from the voltage level of the third power supply voltage VDD3 of the third power supply line VS3 approximately at the same time (rising time Tu2) as the fall timing of the second clock signal SCLK2.

Therefore, since the current drive capability of the MOS transistor Trp1 is smaller than the current drive capability of the MOS transistor Trp4, the falling time Td1 of the first boost clock signal CLKU1 can be allowed to differ from the rising time Tu1 of the second boost clock signal CLKU2.

As described above, the rising time and the falling time of the first and second boost clock signals CLKU1 and CLKU2 can be allowed to differ with respect to the rising edge and the falling edge of the first and second clock signals SCLK1 and SCLK2.

The first and second boost clock signals generated by the boost clock generation circuit shown in FIG. 18 are supplied to the gate terminals of two p-channel MOS transistors which make up the charge-pump circuit and are connected in series between two power source lines. This prevents the two MOS transistors from being turned ON at the same time, whereby the shoot-through current can be reduced.

3. Semiconductor device

A semiconductor device including the above-described charge-pump circuit and boost clock generation circuit is described below.

Figure 20:
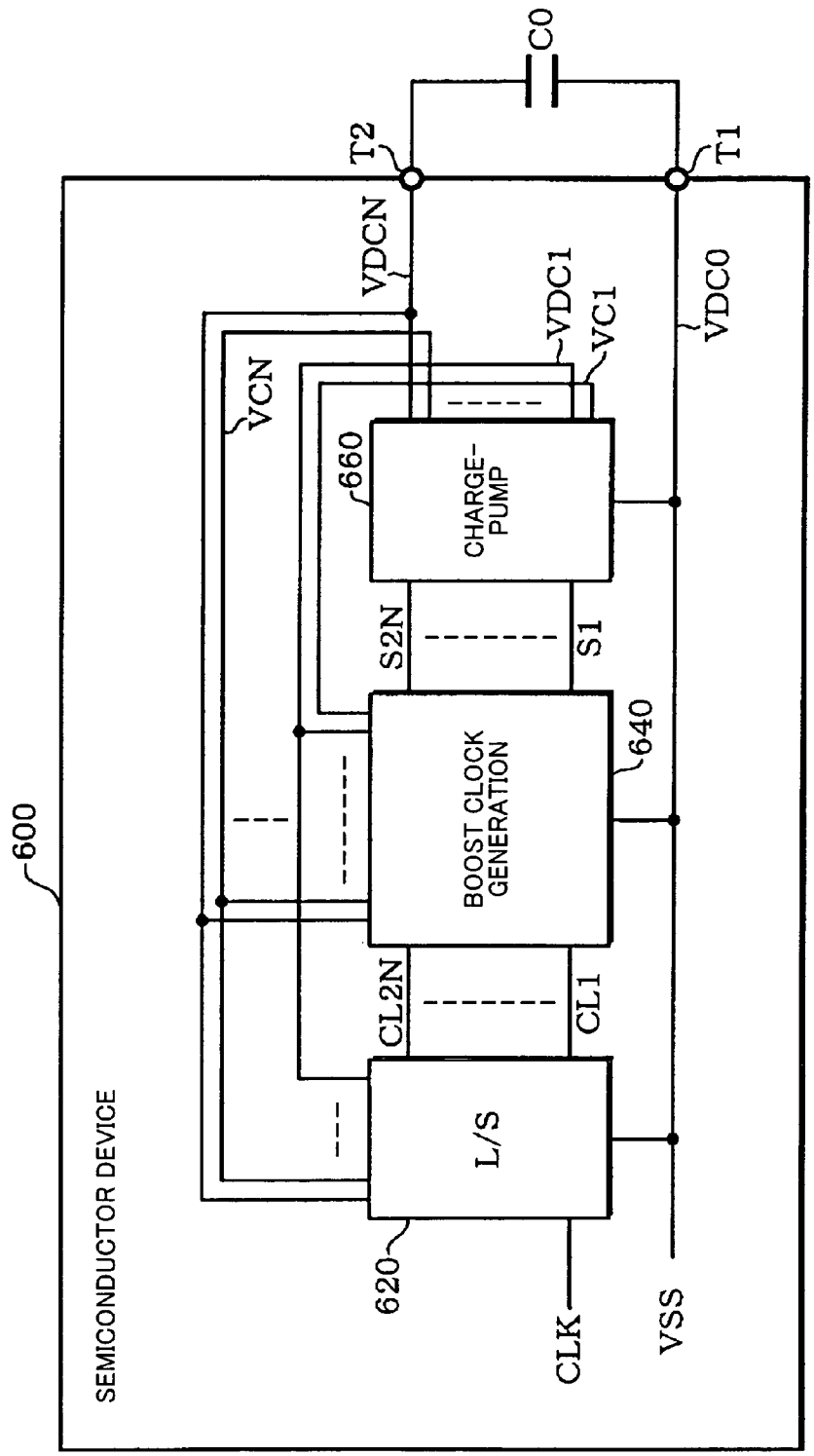
FIG. 20 is a diagram showing the configuration of a semiconductor device according to one embodiment of the present invention.

FIG. 20 shows the configuration of a semiconductor device according to one embodiment of the present invention.

In this embodiment, each of the first to fourth power supply lines of a boost clock generation circuit to which the boost clock generation circuit in this embodiment shown in FIG. 15, 16, or 18 is applied is connected with one of the first to (N+1)th power source lines or one of the first to (2N−1)th connection nodes of the charge-pump circuit.

A semiconductor device 600 in this embodiment includes a level shifter 620, a boost clock generation circuit 640, and a charge-pump circuit 660.

The charge-pump circuit 660 is the same as the charge-pump circuit 200 shown in FIG. 5. Therefore, the capacitor C0 is connected between the first and (N+1)th power source lines outside the semiconductor device 600 through the first and second terminals T1 and T2.

The charge-pump circuit 660 supplies intermediate potentials generated by the charge-pump operation to the level shifter 620 and the boost clock generation circuit 640 through power source lines.

The power source lines include power source lines VDC1 to VDCN and VD1 to VCN. The power source lines VDC1 to VDCN correspond to the second to (N+1)th power source lines VL-2 to VL-(N+1) shown in FIG. 2 or 5. A power source line VDC0 shown in FIG. 20 corresponds to the first power source line VL-1 shown in FIG. 2 or 5.

The power source lines VDC1 to VDCN are power source lines which are electrically connected with the connection nodes to which the boost capacitors are connected among the connection nodes ND-1 to ND-(2N−1) shown in FIG. 2. Specifically, the power source line VC1 is a power source line electrically connected with the connection node ND-1 in the voltage boosting by multiplying a voltage five times (or when N is five). The power source line VC2 is a power source line electrically connected with the connection node ND-3. The power source line VC3 is a power source line electrically connected with the connection node ND-5. The power source line VC4 is a power source line electrically connected with the connection node ND-7. The power source line VC5 is a power source line electrically connected with the connection node ND-9.

Figure 21:
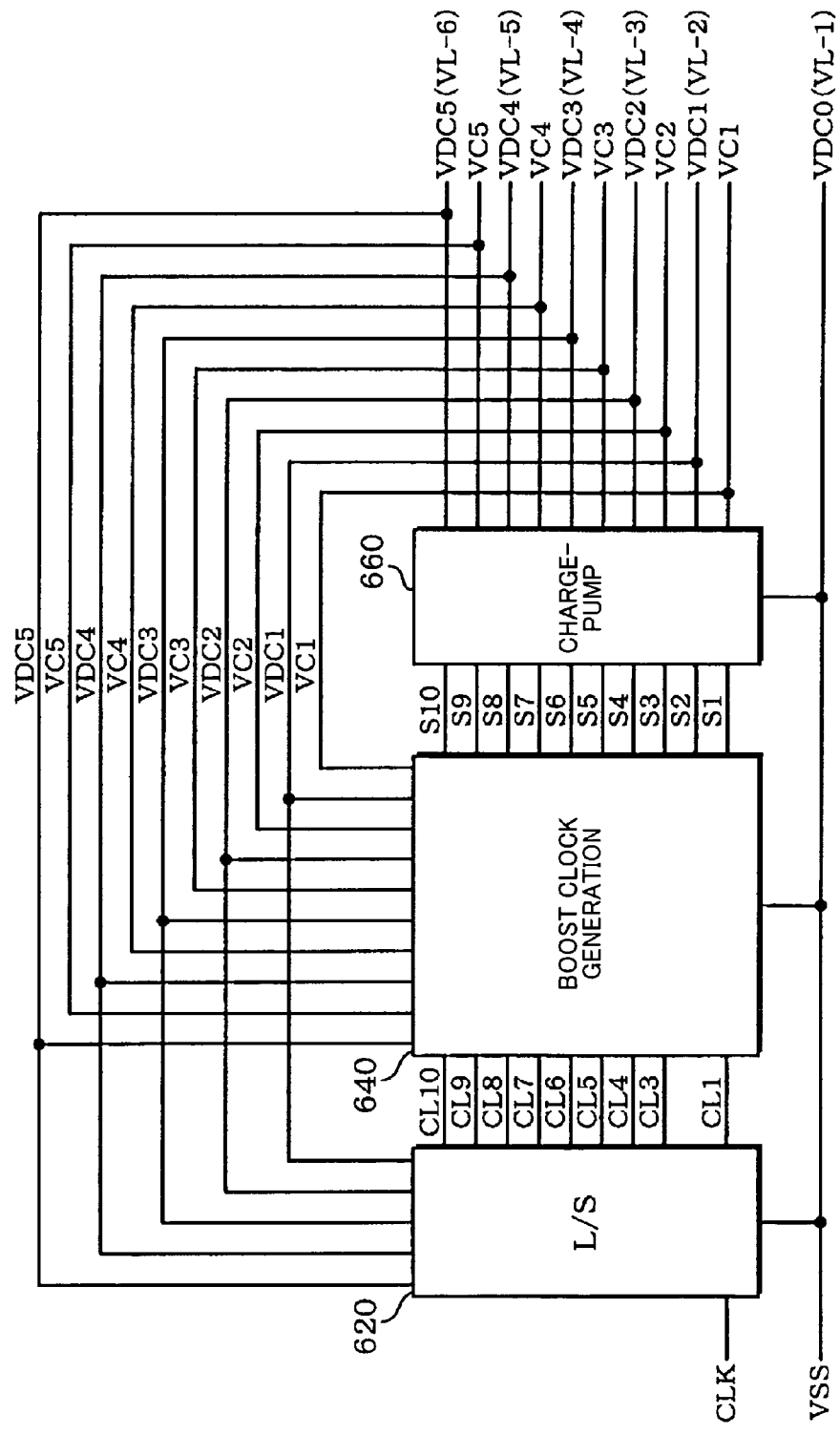
FIG. 21 is a diagram showing connection of the power source lines in a semiconductor device according to one embodiment of the present invention when N is five.

FIG. 21 shows the connection of the power source lines in a semiconductor device according to one embodiment of the present invention when N is five.

The boost clock generation circuit 640 generates the boost clock signals S1 to S2N (S10 when N is five) for the charge-pump circuit 660. The switching element of the charge-pump circuit 660 is controlled by the boost clock signal. The intermediate potential generated by the charge-pump circuit 660 is supplied to the power supply lines of the boost clock generation circuit 640.

The level shifter 620 converts the voltage level of a boost timing control signal CLK to generate boost timing control signals CL1 to CL10. The level shifter 620 uses the intermediate potentials generated by the charge-pump circuit 660.

Figure 22:
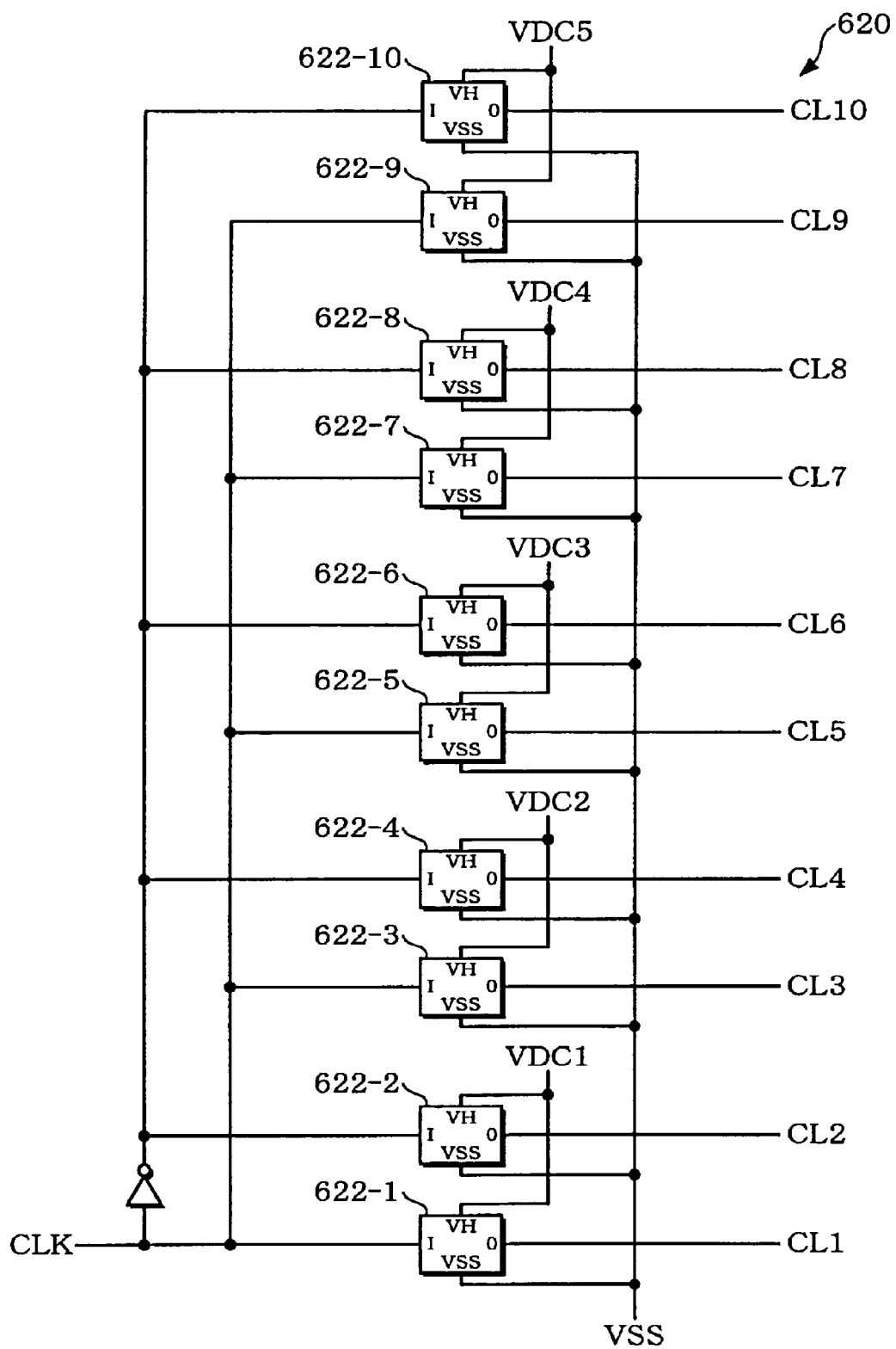
FIG. 22 is a circuit diagram showing an example of the configuration of the level shifter shown in FIG. 20.

FIG. 22 shows an example of the configuration of the level shifter 620. FIG. 22 shows the configuration example when N is five.

The boost timing control signal CLK is supplied to L/S circuits 622-1, 622-3, 622-5, 622-7, and 622-9. An inverted signal of the boost timing control signal CLK is supplied to L/S circuits 622-2, 622-4, 622-6, 622-8, and 622-10. Each of the L/S circuits 622-1 to 622-10 converts the voltage level of the boost timing control signal or the inverted signal of the boost timing control signal.

Figure 23:
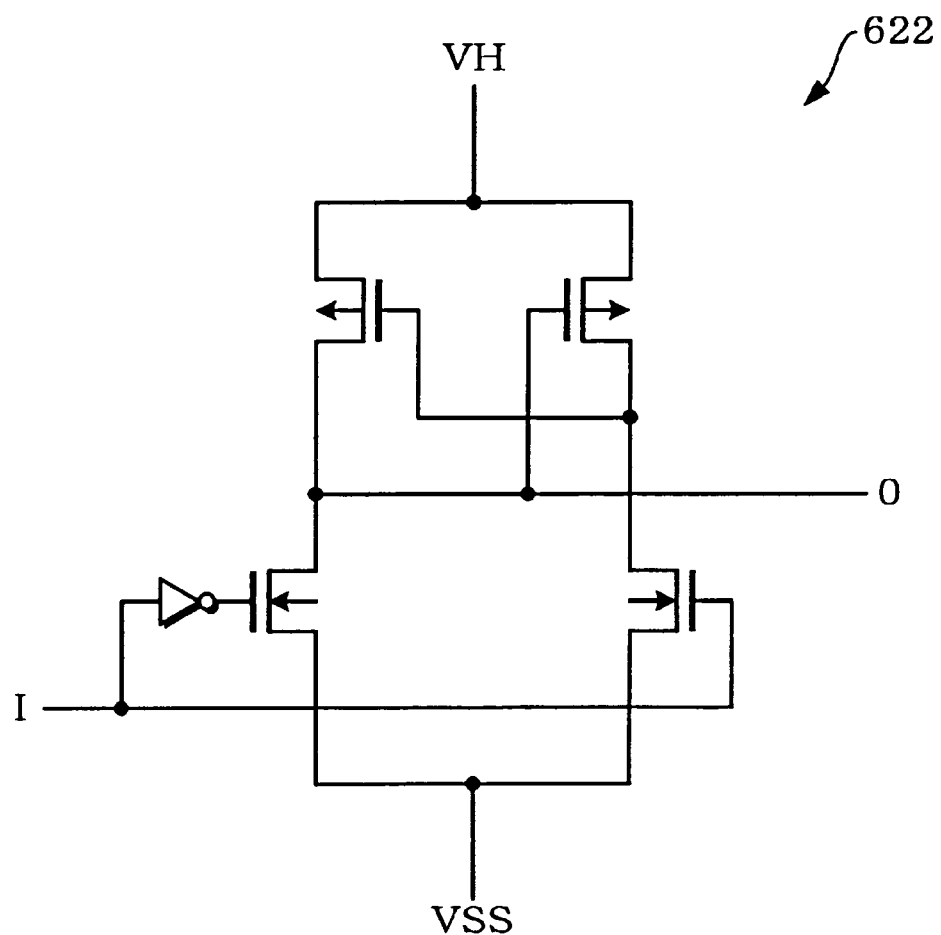
FIG. 23 is a circuit diagram showing the configuration of an L/S circuit shown in FIG. 22.

FIG. 23 shows an example of the configuration of the L/S circuit 622. The L/S circuit 622 converts the voltage level of a signal input to an I terminal into a voltage level between the power supply voltage VH and the power supply voltage VSS.

The L/S circuits 622-1 to 622-10 have the same configuration. Each L/S circuit has the configuration shown in FIG. 23.

The voltage level of the boost timing control signal CLK is converted into a voltage level between the voltages VDC1 and VSS by the L/S circuit 622-1, for example. The voltage level of the inverted signal of the boost timing control signal CLK is converted into a voltage level between the voltages VDC5 and VSS by the L/S circuit 622-10, for example.

The L/S circuits 622-1 to 622-10 convert the voltage level of the boost timing control signal CLK or the inverted signal of the boost timing control signal CLK, and output the converted signals as the boost timing control signals CL1 to CL10. The boost timing control signals CL1 to CL10 are supplied to the boost clock generation circuit 640.

Figure 24:
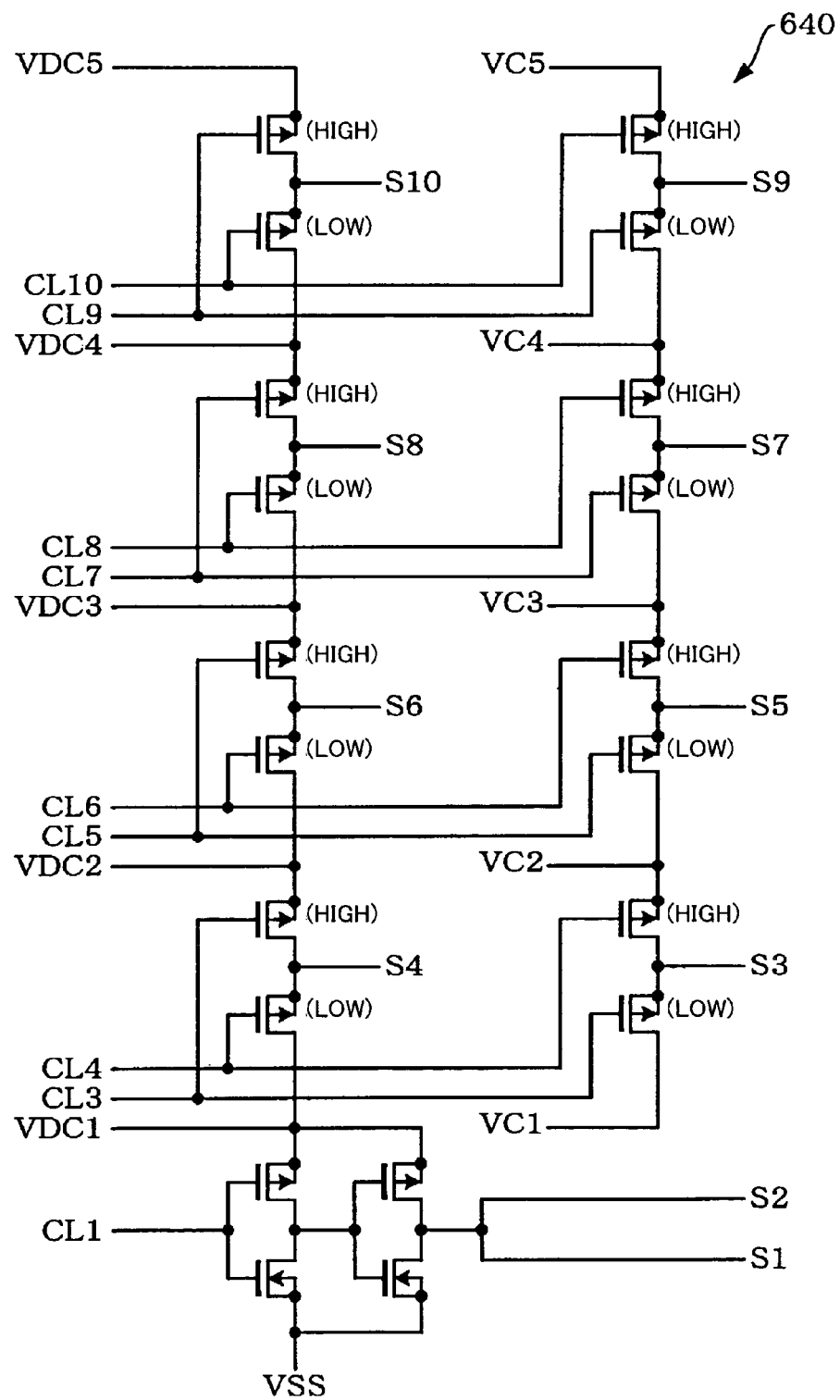
FIG. 24 is a circuit diagram showing an example of the configuration of the boost clock generation circuit shown in FIG. 20.

FIG. 24 shows an example of the configuration of the boost clock generation circuit 640. The boost clock generation circuit 640 generates the boost clock signals S1 to S10 by using the boost timing control signals CL1 to CL10.

Two MOS transistors which generate the boost clock signal S10 correspond to the first and second switch circuits 502 and 504 shown in FIG. 15. Two MOS transistors which generate the boost clock signal S9 correspond to the third and fourth switch circuits 506 and 508 shown in FIG. 15. The boost clock generation circuit which generates the boost clock signals S8 and S7 (boost clock signals S6 and S5 or boost clock signals S4 and S3) also has the same configuration.

In this example, the boost timing control signals CL1, CL3, . . . , CL7, and CL9 are in the same phase, and the boost timing control signals CL2, CL4, . . . , CL8, and CL10 are in the same phase. The boost timing control signals CL1, CL3, . . . , CL7, and CL9 are in reverse phase with the boost timing control signals CL2, CL4, . . . , CL8, and CL10.

The level shift 622-2 can be omitted in FIG. 22 by using the boost timing control signal clocks CL1 and CL2 is common. In this case, the boost clock generation circuit 640 shown in FIG. 24 generates the boost clock signals S1 to S10 based on the boost timing control signals CL1 and CL3 to CL10.

The rising period and the falling period of one of two boost clock signals (S3 and S4, S5 and S6, S7 and S8, S9 and S10) do not coincide with the rising period and the falling period of the other boost clock signal due to the difference in the level of current drive capability between the MOS transistors as shown in FIG. 18, for example.

In FIG. 24, the boost clock signals S1 and S2 are directly output through a buffer.

Figure 25:
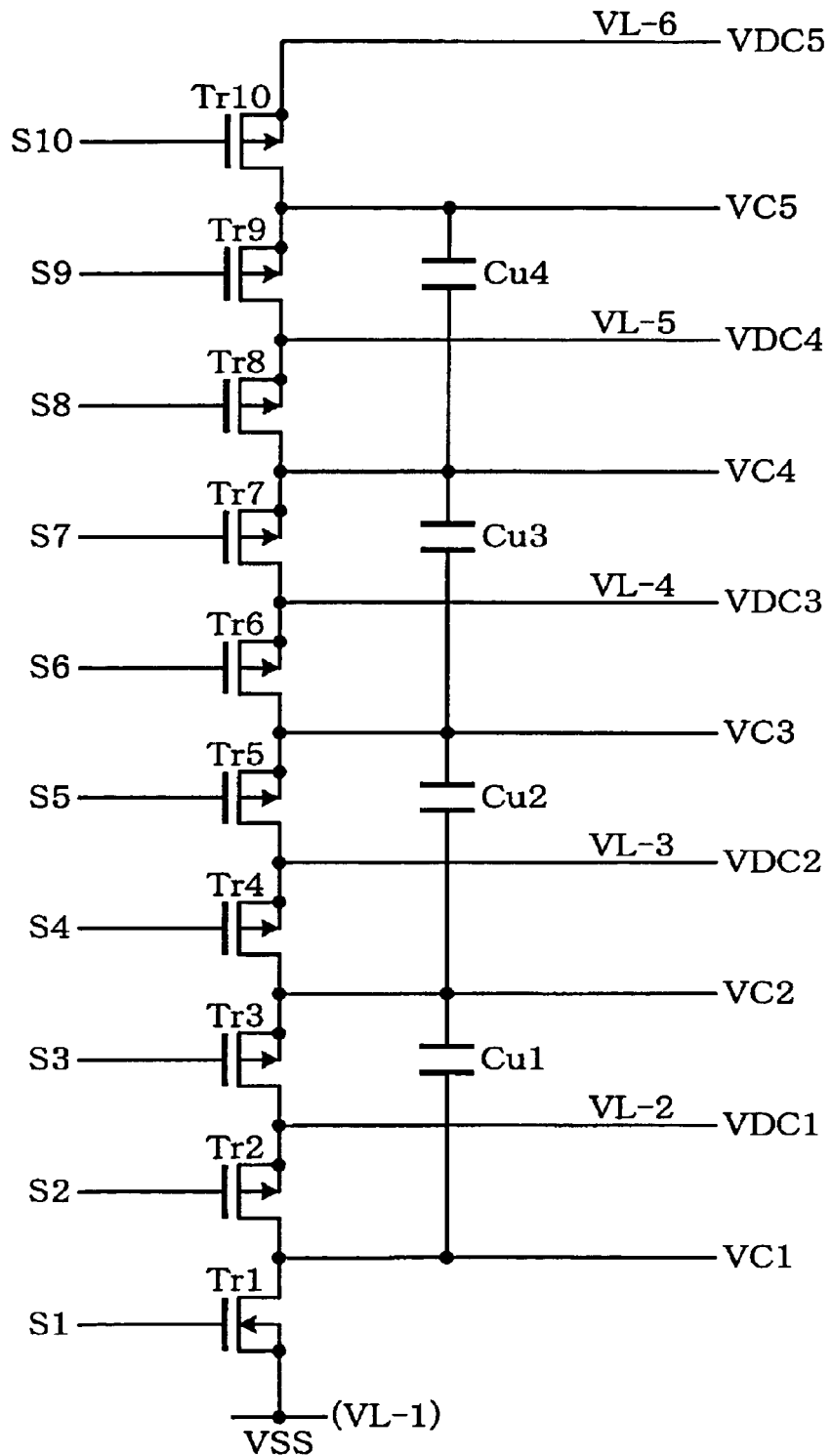
FIG. 25 is a circuit diagram showing an example of the configuration of the charge-pump circuit shown in FIG. 20.

FIG. 25 shows an example of the configuration of the charge-pump circuit 660. The charge-pump circuit 660 has the same configuration as the charge-pump circuit 200 shown in FIG. 5. Therefore, description is omitted.

Figure 26:
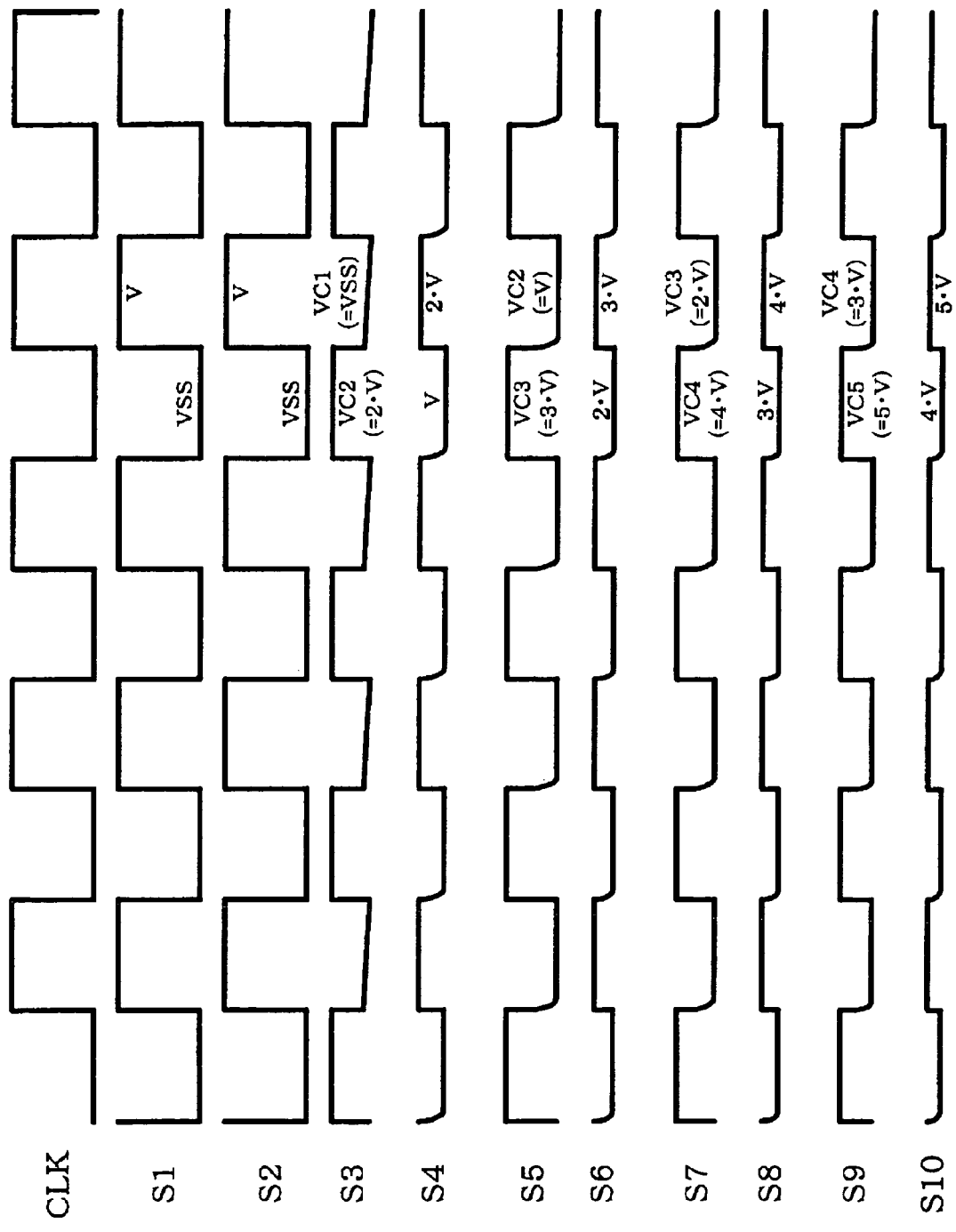
FIG. 26 shows a timing example of the boost clock signals input to the charge-pump circuit shown in FIG. 25.

FIG. 26 shows a timing example of the boost clock signals S1 to S10 input to the charge-pump circuit 660.

Two switching elements connected in series in the charge-pump circuit 660 are prevented from being turned ON at the same time by reducing the rising period and increasing the falling period of the boost clock signals S3 to S10, whereby current consumption can be reduced.

An increase in the circuit scale due to a delay cell can be prevented by simplifying the configuration of the boost clock generation circuit, even in the case of generating ten types of boost clock signals such as in the voltage boosting by multiplying the voltage five times, for example.

The boost clock signal of the charge-pump circuit in the comparative example must have an amplitude of voltage between the boosted voltage and the ground power supply voltage VSS. On the other hand, it suffices that the boost clock signal of the charge-pump circuit in this embodiment have a smaller amplitude. Therefore, the size of the transistor which makes up the boost clock generation circuit can be reduced, whereby the circuit scale can be reduced.

Furthermore, since the boost clock signal is generated by utilizing the difference in the level of current drive capability between two transistors in this embodiment, it is unnecessary to convert the voltage level by providing the level shifter for the reverse phase and the positive phase of the boost clock signal, whereby the circuit scale can be further reduced due to a reduction of the number of level shifters.

The present invention is not limited to the above-described embodiments. Various modifications can be made within the scope of the invention.

The above-described embodiments describe an example in which the present invention is applied to generation of the boost clock signal for the charge-pump circuit in this embodiment as shown in FIG. 2 or 5. However, the present invention is not limited thereto. For example, the present invention may be applied to generation of the boost clock signals of the charge-pump circuit in the comparative example shown in FIG. 10.

The case where an additional device is included between the switching elements or between the capacitors in FIGS. 1, 2, 5, 15, 16, 18, and 20 to 25 is also included in the equivalent range of the present invention.

Part of requirements of any claim of the present invention could be omitted from a dependent claim which depends on that claim. Moreover, part of requirements of any independent claim of the present invention could be made to depend on any other independent claim.

Various features relating to the above description will be shown below.

According to one embodiment of the present invention, there is provided a boost clock generation circuit which generates first and second boost clock signals used to control two switching elements connected in series between two power source lines in a charge-pump circuit, the boost clock generation circuit comprising:

a first switch circuit connected between a first power supply line to which a first power supply voltage is supplied and a first clock output line to which the first boost clock signal is output;

a second switch circuit connected between a second power supply line to which a second power supply voltage is supplied and the first clock output line;

a third switch circuit connected between a third power supply line to which a third power supply voltage is supplied and a second clock output line to which the second boost clock signal is output; and a fourth switch circuit connected between a fourth power supply line to which a forth power supply voltage is supplied and the second clock output line, wherein the first and second switch circuits are ON/OFF controlled based on a first clock signal so that one of the first and second switch circuits is exclusively turned ON;

wherein the third and fourth switch circuits are ON/OFF controlled based on a second clock signal so that one of the third and fourth switch circuits is exclusively turned ON;

wherein the level of current drive capability of the first switch circuit in an ON state differs from the level of current drive capability of the third switch circuit in an ON state; and wherein the level of current drive capability of the second switch circuit in an ON state differs from the level of current drive capability of the fourth switch circuit in an ON state.

In this boost clock generation circuit, the rising time and the falling time of the first boost clock signal can be made different from the rising time and the falling time of the second boost clock signal by making the levels of current drive capability of the first and third switch circuits different, and the levels of current drive capability of the second and fourth switch circuits different. Therefore, the rising period and the falling period of the first boost clock signal do not coincide with the rising period and the falling period of the second boost clock signal in response to the first and second clock signals. By controlling the two switching elements connected in series between two power source lines in the charge-pump circuit by using the first and second boost clock signals, a shoot-through current which flows between two switching elements can be reduced. Moreover, the first and second boost clock signals can be generated by simple configuration, whereby an increase in the circuit scale can be prevented.

In this boost clock generation circuit, the second power supply voltage may be higher than the first power supply voltage; the fourth power supply voltage may be higher than the third power supply voltage; the first and second clock signals may be in the same phase; the current drive capability of the first switch circuit in an ON state may be smaller than the current drive capability of the third switch circuit in an ON state; and the current drive capability of the second switch circuit in an ON state may be larger than the current drive capability of the fourth switch circuit in an ON state.

For example, an n-channel MOS transistor and a p-channel MOS transistor can be prevented from being turned ON at the same time by supplying the first and second boost clock signals to gate terminals of the two MOS transistors which are part of the charge-pump circuit and connected in series between two power source lines, whereby the shoot-through current can be reduced.

In this boost clock generation circuit, the second power supply voltage may be higher than the first power supply voltage; the fourth power supply voltage may be higher than the third power supply voltage; the first and second clock signals may be in reverse phase; the current drive capability of the first switch circuit in an ON state may be smaller than the current drive capability of the fourth switch circuit in an ON state; and the current drive capability of the second switch circuit in an ON state may be larger than the current drive capability of the third switch circuit in an ON state.

For example, two p-channel MOS transistors can be prevented from being turned ON at the same time by supplying the first and second boost clock signals to gate terminals of the two MOS transistors which are part of the charge-pump circuit and connected in series between two power source lines, whereby the shoot-through current can be reduced.

The first to fourth switch circuits may be transistors.

This makes it possible to simplify the configuration of the boost clock generation circuit.

According to one embodiment of the present invention, there is provided a semiconductor device comprising:

the above boost clock generation circuit; and a charge-pump circuit which outputs a voltage boosted by charge-pump operation using the first and second boost clock signals;

wherein the charge-pump circuit includes:

first to (N+1)th power source lines (N is an integer larger than 2);

first to 2Nth switching elements in which one end of the first switching element is connected to the first power source line, one end of the 2Nth switching element is connected to the (N+1)th power source line, and the remaining switching elements other than the first and 2Nth switching elements are connected in series between the other end of the first switching element and the other end of the 2Nth switching element;

first to (N−1)th boost capacitors in which one end of each of the boost capacitors is connected to a jth connection node (1≦j≦2N−3, j is an odd number) to which the jth and (j+1)th switching elements are connected, and the other end of each of the boost capacitors is connected to a (j+2)th connection node to which the (j+2)th and (j+3)th switching elements are connected; and first to (N−2)th stabilization capacitors in which one end of each of the stabilization capacitors is connected to a kth connection node (2≦k≦2N−4, k is an even number) to which the kth and (k+1)th switching elements are connected, and the other end of each of the stabilization capacitors is connected to a (k+2)th connection node to which the (k+2)th and (k+3)th switching elements are connected;

wherein one of the mth switching element (1≦m≦2N−1, m is an integer) and the (m+1)th switching element is exclusively turned ON or OFF; and wherein two of the first to 2N th switching elements connected in series between two of the first to (N+1)th power source lines are controlled based on the first and second boost cock signals.

In this semiconductor device, the charge-pump circuit may further include an (N−1)th stabilization capacitor connected between the Nth power source line and the (N+1)th power source line; and the (N−1)th stabilization capacitor may store an electric charge discharge from the (N−1)th boost capacitor.

The semiconductor device may further comprise first and second terminals electrically connected to the first and (N+1)th power source lines, wherein a capacitor may be connected between the first and second terminals outside the semiconductor device.

As described above, the switching elements, the boost capacitors, and the stabilization capacitors which forms the charge-pump circuit can be formed by the low-voltage manufacturing process. Moreover, when the switching elements are implemented by using conventional MOS transistors, the MOS transistors can be manufactured by the low-voltage manufacturing process, so the charge/discharge current due to the gate capacitance of the MOS transistors can be reduced.

Furthermore, in comparison with a conventional charge-pump circuit, when capacitors are formed in the same area of a semiconductor device (with the same cost) to obtain the same output impedance (with the same capability), since the charge/discharge frequency of the capacitors can be reduced, current consumption accompanying switching can be reduced. In addition, since the capacitors can be formed by the low-voltage manufacturing process, the charge/discharge current due to the parasitic capacitance of the capacitors can be significantly reduced.

An increase in the circuit scale due to a delay cell can be prevented by simplifying the configuration of the boost clock generation circuit, even if the number of switching elements is increased in the charge-pump circuit.

Furthermore, since the boost clock signal is generated by utilizing the difference in the level of current drive capability between two switching elements in this embodiment, it is unnecessary to convert the voltage level by providing a level shifter for the reverse phase and the positive phase of the boost clock signal, whereby the circuit scale can be further reduced due to a reduction of level shifters.

In this semiconductor device, each of the first to forth power supply lines of the boost clock generation circuit may be electrically connected to one of the first to (N+1)th power source lines or one of the first to (2N−1)th connection nodes of the charge-pump circuit.

What is claimed is:

1. A boost clock generation circuit which generates first and second boost clock signals used to control two switching elements connected in series between two power source lines in a charge-pump circuit, the boost clock generation circuit comprising:

a first switch circuit connected between a first power supply line to which a first power supply voltage is supplied and a first clock output line to which the first boost clock signal is output;

a second switch circuit connected between a second power supply line to which a second power supply voltage is supplied and the first clock output line;

a third switch circuit connected between a third power supply line to which a third power supply voltage is supplied and a second clock output line to which the second boost clock signal is output; and a fourth switch circuit connected between a fourth power supply line to which a fourth power supply voltage is supplied and the second clock output line, wherein the first and second switch circuits are ON/OFF controlled based on a first clock signal so that one of the first and second switch circuits is exclusively turned ON;

wherein the third and fourth switch circuits are ON/OFF controlled based on a second clock signal so that one of the third and fourth switch circuits is exclusively turned ON;

wherein a current drive capability to drive an output of the first switch circuit in an ON state differs from current drive capability to drive an output of the third switch circuit in an ON state; and wherein a current drive capability to drive an output of the second switch circuit in an ON state differs from a current drive capability to drive an output of the fourth switch circuit in an ON state.

2. The boost clock generation circuit as defined in claim 1, wherein:

the second power supply voltage is higher than the first power supply voltage;

the fourth power supply voltage is higher than the third power supply voltage;

the first and second clock signals are in the same phase;

the current drive capability to drive the output of the first switch circuit in an ON state is smaller than the current drive capability to drive the output of the third switch circuit in an ON state; and the current drive capability to drive the output of the second switch circuit in an ON state is larger than the current drive capability to drive the output of the fourth switch circuit in an ON state.

3. The boost clock generation circuit as defined in claim 1, wherein:

the second power supply voltage is higher than the first power supply voltage;

the fourth power supply voltage is higher than the third power supply voltage;

the first and second clock signals are in reverse phase;

the current drive capability to drive the output of the first switch circuit in an ON state is smaller than the current drive capability to drive the output of the fourth switch circuit in an ON state; and the current drive capability to drive the output of the second switch circuit in an ON state is larger than the current drive capability to drive the output of the third switch circuit in an ON state.

4. The boost clock generation circuit as defined in claim 1, wherein each of the first to fourth switch circuits is a transistor.

5. A semiconductor device comprising:

the boost cock generation circuit as defined in claim 1; and a charge-pump circuit which outputs a voltage boosted by charge-pump operation using the first and second boost clock signals;

wherein the charge-pump circuit includes:

first to (N+1)th power source lines (N is an integer larger than 2);

first to 2Nth switching elements in which one end of the first switching element is connected to the first power source line, one end of the 2Nth switching element is connected to the (N+1)th power source line, and the remaining switching elements other than the first and 2Nth switching elements are connected in series between the other end of the first switching element and the other end of the 2Nth switching element;

first to (2N−1)th connection nodes to which the ith ($1 \leq i \leq 2N-1$, i is an integer) and (i+1)th switching elements among the first to (2N−1)th connection nodes are connected;

first to (N−1)th boost capacitors in which one end of each of the boost capacitors is connected to a jth connection node ($1 \leq j \leq 2N-3$, j is an odd number) to which the jth and (J+1)th switching elements among the first to 2Nth switching elements are connected, and the other end of each of the boost capacitors is connected to a (j+2)th connection node to which the (j+2)th and (j+3)th switching elements among the first to 2Nth switching elements are connected; and first to (N−2)th stabilization capacitors in which one end of each of the stabilization capacitors is connection node ($2 \leq k \leq 2N-4$, k is an even number) to which the kth and (k+1)th switching elements among the first to 2Nth switching elements are connected, and the other end of each of the stabilization capacitors is connected to a (k+2)th connection node to which the (k+2)th and (k+3)th switching elements among the first to 2Nth switching elements are connected;

wherein one of the mth switching element ($1 \leq m \leq 2N-1$, m is an integer) and the (m+1)th switching element among the first to 2Nth switching elements is exclusively turned ON or OFF; and wherein two of the first to 2Nth switching elements connected in series between two of the first to (N+1)th power source line are controlled based on the first and second boost clock signals.

6. A semiconductor device comprising the boost clock generation circuit as defined in claim 2; and a charge-pump circuit which outputs a voltage boosted by charge-pump operation using the first and second boost clock signals;

wherein the charge-pump circuit includes:

first to (N+1)th power source line (N is an integer larger than 2);

first to 2Nth switching elements in which one end of the first switching element is connected to the first power source line, one end of the 2Nth switching element is connected to the (N+1)th power source line, and the remaining switching elements other than the first and 2Nth switching elements are connected in series between the other end of the first switching element and the other end of the 2Nth switching elements;

first to (2N−1)th connection nodes to which the ith ($1 \leq i \leq 2N-1$, i is an integer) and (i+1)th switching elements among the first to (2N−1)th connection nodes are connected;

first to (N−1)th boost capacitors in which one end of each of the boost capacitors is connected to a jth connection node ($1 \leq j \leq 2N-3$, j is an odd number) to which the jth and (j+1)th switching elements among the first to 2Nth switching elements are connected, and the other end of each of the boost capacitors is connected to a (j+2)th connection node to which the (j=2)th and (j+3)th switching elements are connected; and first to (N=2)the stabilization capacitors in which one end of each of the stabilization capacitors is connected to a kth connection node ($2 \leq k \leq 2N-4$, k is an even number) to which the kth and (k+1)th switching elements among the first to 2Nth switching elements are connected, and the other end of each of the stabilization capacitors is connected to a (k+2)th connection node to which the (k+2)th and (k+3)th switching elements are connected;

wherein one of the mth switching element ($1 \leq m \leq 2N-1$, m is an integer) and the (m+1)th switching element among the firs to 2Nth switching elements is exclusively turned ON or OFF; and wherein two of the first to 2Nth switching elements connected in series between two of the first to (N+1)th power source lines are controlled based on the first and second boost clock signals.

7. A semiconductor device comprising:

the boost clock generation circuit as defined in claim 3; and a charge-pump circuit which outputs a voltage boosted by charge-pump operation using the first and second boost clock signals;

wherein the charge-pump circuit includes:

first to (N+1)th power source lines (N is an integer larger than 2);

first to 2Nth switching elements in which one end of the first switching element is connected to the first power source line, one end of the 2Nth switching element is connected to the (N+1)th power source line, and the remaining switching elements other than the first and 2Nth switching elements are connected in series between the other end of the first switching element and the other end of the 2Nth switching element;

first to (2N−1)th connection nodes to which the ith (1≦i≦2N−1, i is an integer) and (i+1)th switching elements among the first to (2N−1)th connection nodes are connected;

first to (N−1)th boost capacitors in which one end of each of the boost capacitors is connected to a jth connection node (1≦j≦2N−3, j is an odd number) to which the jth and (J+1)th switching elements among the first to 2Nth switching elements are connected, and the other end of each of the boost capacitors is connected to a (j+2)th connection node to which the (j+2)th and (j+3)th switching elements are connected; and first to (N−2)th stabilization capacitors in which one end of each of the stabilization capacitors is connected to a kth connection node (2≦k≦2N−4, k is an even number) to which the kth and (k+1)th switching elements among the first to 2Nth switching elements are connected, and the other end of each of the stabilization capacitors is connected to a (k+2)th connection node to which the (k+2)th and (k+3)th switching elements are connected;

wherein one of the mth switching element (1≦m≦2N−1, m is an integer) and the (m+1)th switching element among the first to 2Nth switching elements is exclusively turned ON or OFF; and wherein two of the first to 2Nth switching elements connected in series between two of the first to (N+1)th power source lines are controlled based on the first and second boost clock signals.

8. The semiconductor device as defined in claim 5, further comprising:

a (N−1)th stabilization capacitor that stores an electric charge discharged from the (N−1)th boost capacitor;

wherein:

the charge-pump circuit further includes an (N−1)th stabilization capacitor connected between the Nth power source line and the (N+1)th power source line.

9. The semiconductor device as defined in claim 6, further comprising:

a (N−1)th stabilization capacitor that stores an electric charge discharged from the (N−1)th boost capacitor;

wherein:

the charge-pump circuit further includes an (N−1)th stabilization capacitor connected between the Nth power source line and the (N+1)th power source line.

10. The semiconductor device as defined in claim 7, further comprising:

a (N−1)th stabilization capacitor that stores an electric charge discharged from the (N−1)th boost capacitor;

wherein:

the charge-pump circuit further includes an (N−1)th stabilization capacitor connected between the Nth power source line and the (N+1)th power source line.

11. The semiconductor device as defined in claim 5, further comprising:

first and second terminals electrically connected to the first and (N+1)th power source lines, wherein a capacitor is connected between the first and second terminals outside the semiconductor device.

12. The semiconductor device as defined in claim 6, further comprising:

first and second terminals electrically connected to the first and (N+1)th power source lines, wherein a capacitor is connected between the first and second terminals outside the semiconductor device.

13. The semiconductor device as defined in claim 7, further comprising:

first and second terminals electrically connected to the first and (N+1)th power source lines, wherein a capacitor is connected between the first and second terminals outside the semiconductor device.

14. The semiconductor device as defined in claim 5, wherein each of the first to fourth power supply lines of the boost clock generation circuit is electrically connected to one of the first of (N+1)th power source lines.

15. The semiconductor device as defined in claim 6, wherein each of the first to fourth power supply lines of the boost clock generation circuit is electrically connected to one of the first to (N+1)th power source lines.

16. The semiconductor device as defined in claim 7, wherein each of the first to fourth power supply lines of the boost clock generation circuit is electrically connected to one of the first to (N+1)th power source lines.

17. The semiconductor device as defined in claim 5, wherein each of the first to fourth power supply lines to the boost clock generation circuit is electrically connected to one of the first to (2N−1)th connection nodes of the charge-pump circuit.

18. The semiconductor device as defined in claim 6, wherein each of the first to fourth power supply lines of the boost clock generation circuit is electrically connected to one of the first to (2N−1)th connection nodes of the charge-pump circuit.

19. The semiconductor device as defined in claim 7, wherein each of the first to fourth power supply lines of the boost clock generation circuit is electrically connected to one of the first to (2N−1)th connection nodes of the charge-pump circuit.

* * * * *